United States Patent
Hamada

(10) Patent No.: US 10,880,415 B2
(45) Date of Patent: Dec. 29, 2020

(54) DETECTING DEVICE, GATEWAY DEVICE, AND DETECTING METHOD

(71) Applicants: SUMITOMO ELECTRIC INDUSTRIES, LTD., Osaka (JP); Sumitomo Wiring Systems, Ltd., Yokkaichi (JP); AutoNetworks Technologies, Ltd., Yokkaichi (JP)

(72) Inventor: Yoshihiro Hamada, Osaka (JP)

(73) Assignees: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(*) Notice: Subject to any disclaimer, the term of this patent is extended or adjusted under 35 U.S.C. 154(b) by 0 days.

(21) Appl. No.: 16/325,480

(22) PCT Filed: Jun. 28, 2017

(86) PCT No.: PCT/JP2017/023673
§ 371 (c)(1),
(2) Date: Feb. 14, 2019

(87) PCT Pub. No.: WO2018/051607
PCT Pub. Date: Mar. 22, 2018

(65) Prior Publication Data
US 2019/0191020 A1    Jun. 20, 2019

(30) Foreign Application Priority Data

Sep. 15, 2016 (JP) .................. 2016-180284

(51) Int. Cl.
*H04L 29/06* (2006.01)
*B60R 16/023* (2006.01)
(Continued)

(52) U.S. Cl.
CPC ............ *H04L 69/26* (2013.01); *B60R 16/023* (2013.01); *H04L 12/28* (2013.01);
(Continued)

(58) Field of Classification Search
CPC .......... H04L 2012/40215; H04L 63/00; H04L 63/14; H04L 63/1408
See application file for complete search history.

(56) References Cited

U.S. PATENT DOCUMENTS

2014/0328352 A1* 11/2014 Mabuchi ............. H04L 12/4035
                                                      370/451
2015/0358351 A1* 12/2015 Otsuka ................ H04L 12/4625
                                                      726/23
(Continued)

FOREIGN PATENT DOCUMENTS

JP       2004-86367 A      3/2004
JP       2015-136107 A     7/2015
(Continued)

OTHER PUBLICATIONS

Cappé, Oliver, et al., "Online EM Algorithm for Latent Data Models," Jounral of the Royal Statistics Society: Series B (Statistical Methodology), vol. 71, 2009, pp. 593-613.

(Continued)

*Primary Examiner* — Mansour Oveissi
(74) *Attorney, Agent, or Firm* — Faegre Drinker Riddle & Reath LLP

(57) ABSTRACT

Provided is a detecting device which detects an unauthorized message in a vehicle-mounted network including a plurality of vehicle-mounted devices and includes a monitoring unit that monitors a transmission message in the vehicle-mounted network, an acquisition unit that acquires a distribution of transmission intervals between the transmission messages, and a detecting unit that detects the unauthorized message on the basis of a monitoring result of the monitoring unit and the distribution acquired by the acquisition unit.

10 Claims, 15 Drawing Sheets

(51) Int. Cl.
H04L 12/28 (2006.01)
H04L 12/40 (2006.01)
H04L 12/66 (2006.01)
H04L 12/26 (2006.01)

(52) U.S. Cl.
CPC ........ *H04L 12/40032* (2013.01); *H04L 12/66* (2013.01); *H04L 43/062* (2013.01); *H04L 2012/40273* (2013.01)

(56) References Cited

U.S. PATENT DOCUMENTS

2017/0324579 A1 11/2017 Takada et al.
2018/0241584 A1* 8/2018 Ruvio ................ G05B 19/0423

FOREIGN PATENT DOCUMENTS

| JP | 2016-97879 A | 5/2016 |
| JP | 2016-116075 A | 6/2016 |
| JP | 2016-134913 A | 7/2016 |
| WO | WO-2016/080422 A1 | 5/2016 |

OTHER PUBLICATIONS

Dempster, A. P., et al., "Maximum Likelihood from Incomplete Data via the EM Algorithm," Journal of the Royal Statistical Society B, vol. 39, No. 1, 1977, pp. 1-38.
Knuth, D. E., "The Art of Computer Programming, vol. 2 Seminumerial Algorithms Third Edition," 2015, p. 219.
Welford, B. P., "Note on a Method for Calculating Corrected Sums of Squares and Products," Technometrics, vol. 4, No. 3, 1962, pp. 419-420.

* cited by examiner

F I G. 2
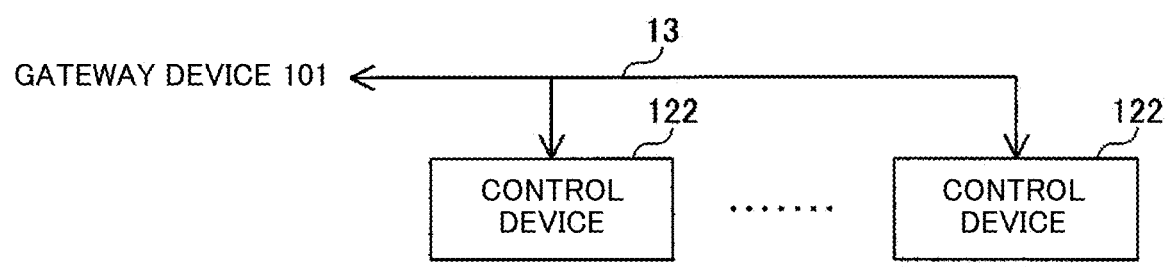

F I G. 3
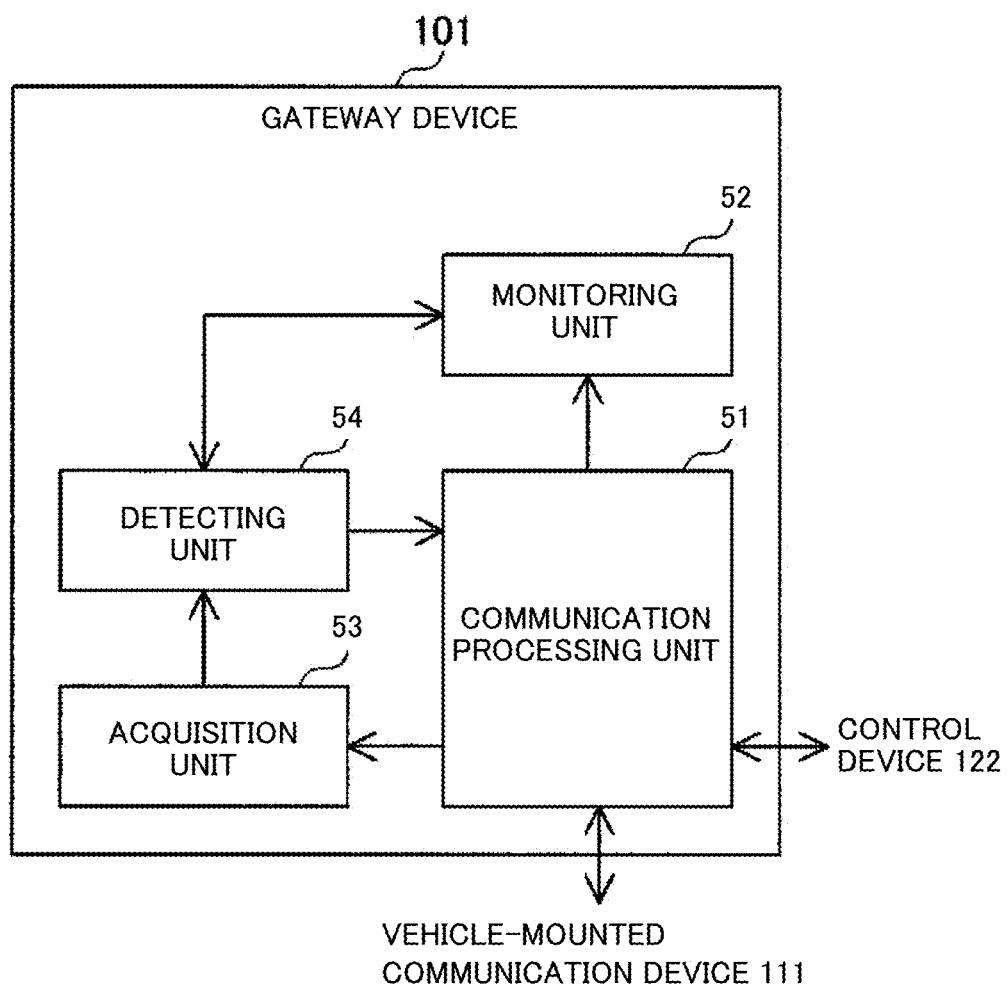

DETECTING DEVICE, GATEWAY DEVICE, AND DETECTING METHOD

CROSS-REFERENCE TO RELATED APPLICATIONS

This application is the national phase under 35 U.S.C. § 371 of PCT International Application No. PCT/JP2017/023673 which has an International filing date of Jun. 28, 2017 and designated the United States of America.

FIELD

The present disclosure relates to a detecting device, a gateway device, a detecting method, and a detecting program.

This application claims priority based on Japanese Patent Application No. 2016-180284 filed on Sep. 15, 2016, the content of which is incorporated herein by reference in its entirety.

BACKGROUND

Patent Document 1 (Japanese Patent Laid-Open Publication No. 2016-116075) discloses the following vehicle-mounted communication system.

That is, the vehicle-mounted communication system performs message authentication, using a transmission side code which is a message authentication code generated by a communication data transmission side and a reception side code which is a message authentication code generated by a communication data reception side, and includes a first ECU that is connected to a vehicle-mounted network and stores only a first encryption key of the first encryption key and a second encryption key different from the first encryption key, a second ECU that is connected to the vehicle-mounted network and stores at least the first encryption key, and a third ECU that is connected to the vehicle-mounted network and a network outside the vehicle, stores only the second encryption key of the first encryption key and the second encryption key, and generates the transmission side code or the reception side code, using the second encryption key, at the time of communication in the vehicle-mounted network. The second ECU transmits communication data to which the transmission side code generated using the first encryption key has been given. In a case in which the communication data is received, the first ECU verifies the transmission side code given to the received communication data with the reception side code generated using the first encryption key.

SUMMARY OF INVENTION (1) According to the present disclosure, there is provided a detecting device that detects an unauthorized message in a vehicle-mounted network including a plurality of vehicle-mounted devices. The detecting device includes: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit.

(10) According to the present disclosure, there is provided a gateway device that relays a message between vehicle-mounted devices in a vehicle-mounted network. The gateway device includes: a monitoring unit that monitors a transmission message in the vehicle-mounted network; an acquisition unit that acquires a distribution of transmission intervals between the transmission messages; and a detecting unit that detects an unauthorized message on the basis of a monitoring result of the monitoring unit and the distribution acquired by the acquisition unit.

(11) According to the present disclosure, there is provided a detecting method in a detecting device that detects an unauthorized message in a vehicle-mounted network including a plurality of vehicle-mounted devices. The detecting method includes: a step of monitoring a transmission message in the vehicle-mounted network; a step of acquiring a distribution of transmission intervals between the transmission messages; and a step of detecting the unauthorized message on the basis of a monitoring result and the acquired distribution.

(12) According to the present disclosure, there is provided a detecting method in a gateway device that relays a message between vehicle-mounted devices in a vehicle-mounted network. The detecting method includes: a step of monitoring a transmission message in the vehicle-mounted network; a step of acquiring a distribution of transmission intervals between the transmission messages; and a step of detecting an unauthorized message on the basis of a monitoring result and the acquired distribution.

(13) According to the present disclosure, there is provided a detecting program that is used in a detecting device detecting an unauthorized message in a vehicle-mounted network including a plurality of vehicle-mounted devices and causes a computer to function as: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit.

(14) According to the present disclosure, there is provided a detecting program that is used in a gateway device relaying a message between vehicle-mounted devices in a vehicle-mounted network and causes a computer to function as: a monitoring unit that monitors a transmission message in the vehicle-mounted network; an acquisition unit that acquires a distribution of transmission intervals of the message; and a detecting unit that detects an unauthorized message on the basis of a monitoring result of the monitoring unit and the distribution acquired by the acquisition unit.

One aspect of the present disclosure can be implemented not only as the detecting device having the above-mentioned characteristic processing units but also as a vehicle-mounted detecting system including the detecting device. Further, one aspect of the present disclosure can be implemented as a semiconductor integrated circuit for implementing a part or the whole of the detecting device.

In addition, one aspect of the present disclosure can be implemented not only as the gateway device having the above-mentioned characteristic processing units but also as a vehicle-mounted detecting system including the gateway device. Furthermore, one aspect of the present disclosure can be implemented as a semiconductor integrated circuit for implementing a part or the whole of the gateway device.

BRIEF DESCRIPTION OF THE DRAWINGS

FIG. 2 is a diagram illustrating the configuration of a bus connection device group according to the first embodiment of the disclosure.

FIG. 3 is a diagram illustrating the configuration of a gateway device in a vehicle-mounted detecting system according to the first embodiment of the disclosure.

DETAILED DESCRIPTION

Figure 1:
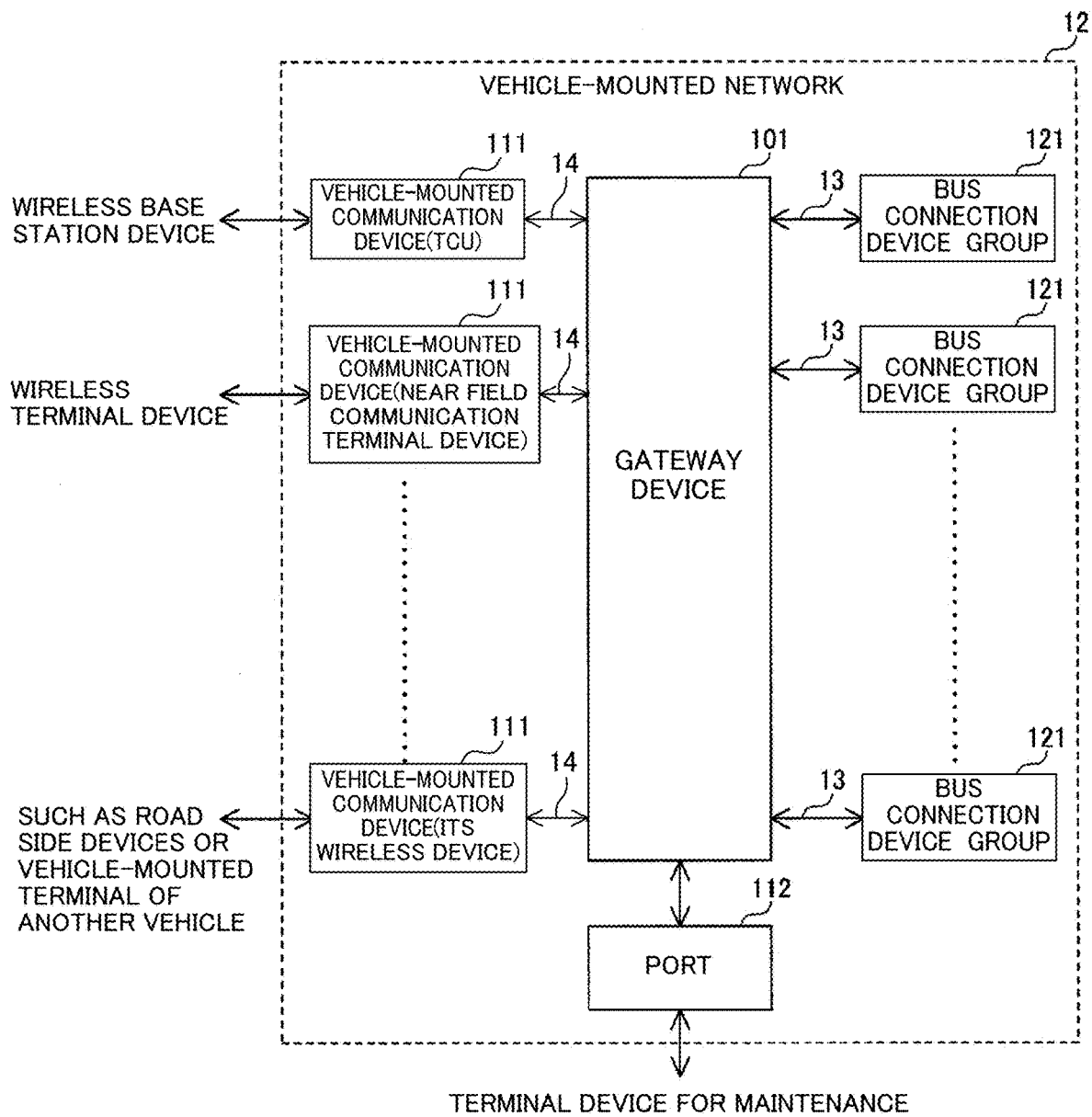
FIG. 1 is a diagram illustrating the configuration of a vehicle-mounted detecting network according to a first embodiment of the disclosure.

A vehicle-mounted network system for improving the security of a vehicle-mounted network has been developed.

Patent Document 1 discloses the configuration in which the first encryption key used for message authentication by the first ECU and the second ECU connected only to the vehicle-mounted network and the second encryption key used by the third ECU connected to both the vehicle-mounted network and the network outside the vehicle are different from each other to prevent cyber attacks against the first ECU and the second ECU which are not connected to the network outside the vehicle from the network outside the vehicle.

However, in security measures using message authentication, the security measures are likely to be invalidated by, for example, attacks that exploit protocol vulnerability, attacks by the illegal acquisition of the first encryption key, and attacks that exploit the obsolescence of encryption algorithms.

In this case, a technique for accurately detecting the intrusion of an attacker into the vehicle-mounted network is required.

The present disclosure has been made in order to solve the above-mentioned problems and an object of the present disclosure is to provide a detecting device, a gateway device, a detecting method, and a detecting program that can accurately detect an unauthorized message in a vehicle-mounted network.

According to the present disclosure, it is possible to accurately detect an unauthorized message in a vehicle-mounted network.

First, the content of embodiments of the disclosure will be described.

(1) According to an aspect of the present disclosure, there is provided a detecting device that detects an unauthorized message in a vehicle-mounted network including a plurality of vehicle-mounted devices. The detecting device includes: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

(2) Preferably, the detecting unit detects the unauthorized message on the basis of content of the transmission message monitored by the monitoring unit.

For example, this configuration makes it possible to detect, as an unauthorized message, the transmission message that is erroneously detected as an authorized transmission message on the basis of the transmission interval and the distribution even though it is an unauthorized message, on the basis of the content of the transmission message. Therefore, it is possible to more accurately detect an unauthorized message in the vehicle-mounted network.

(3) More preferably, the content is a continuous value.

For example, this configuration makes it possible to create a distribution based on the content of the transmission message. Therefore, it is possible to detect a transmission message including content in the range in which the frequency is low in the distribution as an unauthorized message.

(4) More preferably, the continuous value is at least one of a speed of a vehicle provided with the vehicle-mounted network, a tire pressure of the vehicle, a steering angle of the vehicle, an accelerator position of the vehicle, the number of revolutions and a cylinder pressure of an engine of the vehicle, weight of a person in the vehicle, acceleration of the vehicle, the number of revolutions of a motor of the vehicle, braking torque of the vehicle, a yaw rate of the vehicle, and reception intensity of radio waves used in the vehicle.

As such, since the continuous value is a continuous value which varies from a mean, it is possible to create a distribution in which the frequency is concentrated in the vicinity of the mean and which is suitable for detecting an unauthorized message.

(5) Preferably, the monitoring unit measures the transmission interval between the transmission messages, and the detecting unit detects the unauthorized message on the basis of the transmission interval measured by the monitoring unit, the distribution, and a predetermined threshold.

With this configuration, the range of the transmission interval in which the transmission message is determined to be an unauthorized message in the distribution can be determined by the threshold. Therefore, it is possible to easily determine whether the transmission message is an unauthorized message.

(6) Preferably, the monitoring unit measures the transmission interval between the transmission messages, and the detecting unit detects the unauthorized message on the basis of a position of the transmission interval measured by the monitoring unit in the distribution.

For example, this configuration makes it possible to easily determine whether the transmission message is an unauthorized message in a case in which the range of the transmission interval in which the transmission message is determined to be an unauthorized message in the distribution is determined by the threshold.

(7) Preferably, the monitoring unit measures the transmission interval between the transmission messages, and the detecting device further includes a distribution creation unit that updates the distribution on the basis of the transmission interval measured by the monitoring unit.

This configuration makes it possible to update the distribution according to the degree of variation in the transmission interval, for example, even in a case in which there is a variation in the transmission interval between the transmission messages. Therefore, it is possible to reduce the possibility that an authorized transmission message will be erroneously detected as an unauthorized message.

(8) Preferably, the acquisition unit acquires the distribution which has been created in advance by another device.

As such, the processing load of the detecting device can be reduced by the configuration in which another device performs a distribution creation process whose processing load is large.

(9) Preferably, the monitoring unit measures the transmission interval between the transmission messages, and the monitoring unit uses a reception timing of the transmission message that has been determined not to be an unauthorized message as a measurement standard for the transmission interval.

For example, this configuration makes it possible to prevent a situation in which the measurement standard is set to the reception timing of an unauthorized message, the transmission interval between the reception timing of the unauthorized message and the reception timing of an authorized transmission message is measured after the setting, and the authorized transmission message is erroneously detected as the unauthorized message.

(10) According to an aspect of the present disclosure, there is provided a gateway device that relays a message between vehicle-mounted devices in a vehicle-mounted network. The gateway device includes: a monitoring unit that monitors a transmission message in the vehicle-mounted network; an acquisition unit that acquires a distribution of transmission intervals between the transmission messages; and a detecting unit that detects an unauthorized message on the basis of a monitoring result of the monitoring unit and the distribution acquired by the acquisition unit.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

(11) According to an aspect of the present disclosure, there is provided a detecting method in a detecting device that detects an unauthorized message in a vehicle-mounted network including a plurality of vehicle-mounted devices. The detecting method includes: a step of monitoring a transmission message in the vehicle-mounted network; a step of acquiring a distribution of transmission intervals between the transmission messages; and a step of detecting the unauthorized message on the basis of a monitoring result and the acquired distribution.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

(12) According to an aspect of the present disclosure, there is provided a detecting method in a gateway device that relays a message between vehicle-mounted devices in a vehicle-mounted network. The detecting method includes: a step of monitoring a transmission message in the vehicle-mounted network; a step of acquiring a distribution of transmission intervals between the transmission messages; and a step of detecting an unauthorized message on the basis of a monitoring result and the acquired distribution.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

(13) According to an aspect of the present disclosure, there is provided a detecting program that is used in a detecting device detecting an unauthorized message in a vehicle-mounted network including a plurality of vehicle-mounted devices and causes a computer to function as: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

(14) According to an aspect of the present disclosure, there is provided a detecting program that is used in a gateway device relaying a message between vehicle-mounted devices in a vehicle-mounted network and causes a computer to function as: a monitoring unit that monitors a transmission message in the vehicle-mounted network; an acquisition unit that acquires a distribution of transmission intervals of the message; and a detecting unit that detects an unauthorized message on the basis of a monitoring result of the monitoring unit and the distribution acquired by the acquisition unit.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

Hereinafter, embodiments of the invention will be described with reference to the drawings. In the drawings, the same or equivalent portions are denoted by the same reference numerals and the description thereof will not be repeated. In addition, at least some of the following embodiments may be arbitrarily combined with each other.

First Embodiment

[Configuration and Basic Operation]

FIG. 1 is a diagram illustrating the configuration of a vehicle-mounted detecting network according to a first embodiment of the invention.

With reference to FIG. 1, a vehicle-mounted detecting system 301 includes a gateway device (detecting device) 101, a plurality of vehicle-mounted communication devices 111, and a plurality of bus connection device groups 121.

FIG. 2 is a diagram illustrating the configuration of the bus connection device group according to the first embodiment of the invention.

With reference to FIG. 2, the bus connection device group 121 includes a plurality of control devices 122. In addition, the bus connection device group 121 is not limited to the configuration including the plurality of control devices 122 and may include one control device 122.

The vehicle-mounted detecting system 301 is provided in a vehicle (hereinafter, also referred to as a target vehicle) that runs on a road. A vehicle-mounted network 12 includes a plurality of vehicle-mounted devices which are devices provided in the vehicle. Specifically, the vehicle-mounted network 12 includes the plurality of vehicle-mounted communication devices 111 and the plurality of control devices 122 which are examples of the vehicle-mounted device. In addition, the vehicle-mounted network 12 may have a configuration that includes a plurality of vehicle-mounted communication devices 111 and does not include the control device 122, a configuration that does not include the vehicle-mounted communication device 111 and includes a plurality of control devices 122, or a configuration that includes one vehicle-mounted communication device 111 and one control device 122 as long as it includes a plurality of vehicle-mounted devices.

In the vehicle-mounted network 12, the vehicle-mounted communication device 111 communicates with, for example, a device outside the target vehicle. Specifically, the vehicle-mounted communication device 111 is, for example, a telematics communication unit (TCU), a near field communication terminal device, and an intelligent transport systems (ITS) wireless device.

The TCU can wirelessly communicate with a wireless base station device according to a communication standard, such as Long Term Evolution (LTE) or 3G, and can communicate with the gateway device 101. For example, the TCU relays information used for a navigation service, a vehicle theft prevention service, a remote maintenance service, and a Firmware Over The Air (FOTA) service.

The near field communication terminal device can wirelessly communicate with a wireless terminal device, such as a smart phone held by a person (hereinafter, also referred to as a passenger) in the target vehicle according to a communication standard, such as Wi-Fi (registered trademark) or Bluetooth (registered trademark), and can communicate with the gateway device 101. For example, the near field communication terminal device relays information used for an entertainment service.

In addition, the near field communication terminal device can wirelessly communicate with a wireless terminal device, such as a smart key held by the passenger, and a wireless terminal device provided in a tire, using radio waves in a low frequency (LF) band or an ultra high frequency (UHF) band, according to a predetermined communication standard and can communicate with the gateway device 101. For example, the near field communication terminal device relays information used for a smart entry service and a tire pressure monitoring system (TPMS) service.

The ITS wireless device can perform road-to-vehicle communication with road side devices, such as an optical beacon, a radio beacon, and an ITS spot provided in the vicinity of the road, can perform vehicle-to-vehicle communication with a vehicle-mounted terminal provided in another vehicle, and can perform communication with the gateway device 101. For example, the ITS wireless device relays information used for a traffic congestion mitigation service, a safe driving support service, and a route guidance service.

The gateway device 101 can transmit and receive, for example, firmware update data and data accumulated by the gateway device 101 to and from a terminal device for maintenance outside the target vehicle through a port 112.

The gateway device 101 is connected to the terminal devices through, for example, buses 13 and 14. Specifically, the buses 13 and 14 are based on, for example, standards, such as Controller Area Network (CAN) (registered trademark), FlexRay (registered trademark), Media Oriented Systems Transport (MOST) (registered trademark), Ethernet (registered trademark), and Local Interconnect Network (LIN).

In this example, the vehicle-mounted communication device 111 is connected to the gateway device 101 through the corresponding bus 14 based on the Ethernet standard. In addition, each control device 122 in the bus connection device group 121 is connected to the gateway device 101 through the corresponding bus 13 based on the CAN standard. The control device 122 can control, for example, a functional unit in the target vehicle.

For example, the buses 13 are provided for each system. Specifically, the buses 13 are, for example, a driving system bus, a chassis/safety system bus, a body/electric system bus, and an AV/information system bus.

An engine control device, an automatic transmission (AT) control device, and a hybrid electric vehicle (HEV) control device which are examples of the control device 122 are connected to the driving system bus. The engine control device, the AT control device, and the HEV control device control an engine, an AT, and switching between the engine and a motor, respectively.

A brake control device, a chassis control device, and a steering control device which are examples of the control device 122 are connected to the chassis/safety system bus. The brake control device, the chassis control device, and the steering control device control a brake, a chassis, and steering, respectively.

An instrument display control device, an air conditioner control device, a theft prevention control device, an air bag control device, and a smart entry control device which are examples of the control device 122 are connected to the body/electric system bus. The instrument display control device, the air conditioner control device, the theft prevention control device, the air bag control device, and the smart entry control device control instruments, an air conditioner, an antitheft mechanism, an air bag mechanism, and smart entry, respectively.

A navigation control device, an audio control device, an Electronic Toll Collection System (ETC) (registered trademark) control device, and a telephone control device which are examples of the control device 122 are connected to the AV/information system bus. The navigation control device, the audio control device, the ETC control device, and the telephone control device control a navigation device, an audio device, an ETC device, and a mobile phone, respectively.

In addition, the invention is not limited to the configuration in which the control device 122 is connected to the bus 13 and devices other than the control device 122 may be connected to the bus 13.

The gateway device 101 is, for example, a central gateway (CGW) and can communicate with the vehicle-mounted devices.

The gateway device 101 performs, for example, a relay process of relaying information exchanged between the control devices 122 connected to different buses 13 in the target vehicle, information exchanged between the vehicle-mounted communication devices 111, and information exchanged between the control device 122 and the vehicle-mounted communication device 111.

More specifically, in the target vehicle, a message is periodically transmitted from a certain vehicle-mounted device to another vehicle-mounted device according to a predetermined protocol. In this example, the message periodically transmitted from a certain control device 122 to another control device 122 will be described. This holds for a message transmitted between the control device 122 and the vehicle-mounted communication device 111 and a message transmitted between the vehicle-mounted communication devices 111.

The message may be transmitted by broadcast or unicast. Hereinafter, the message transmitted periodically is also referred to as a periodic message.

Further, in the target vehicle, there is a message that is irregularly transmitted from a certain control device 122 to another control device 122 in addition to the periodic message. The message includes an ID for identifying, for example, the content of the message and a transmission source. Whether the message is a periodic message can be identified by the ID.

FIG. 3 is a diagram illustrating the configuration of the gateway device in the vehicle-mounted detecting system according to the first embodiment of the invention.

With reference to FIG. 3, the gateway device 101 includes a communication processing unit 51, a monitoring unit 52, an acquisition unit 53, and a detecting unit 54.

The gateway device 101 functions as the detecting device and detects an unauthorized message in the vehicle-mounted network 12 including a plurality of vehicle-mounted devices.

Specifically, the communication processing unit 51 of the gateway device 101 performs a relay process. More specifically, in a case in which a message is received from a certain control device 122 through the corresponding bus 13, the communication processing unit 51 transmits the received message to another control device 122 through the corresponding bus 13.

Figure 4:
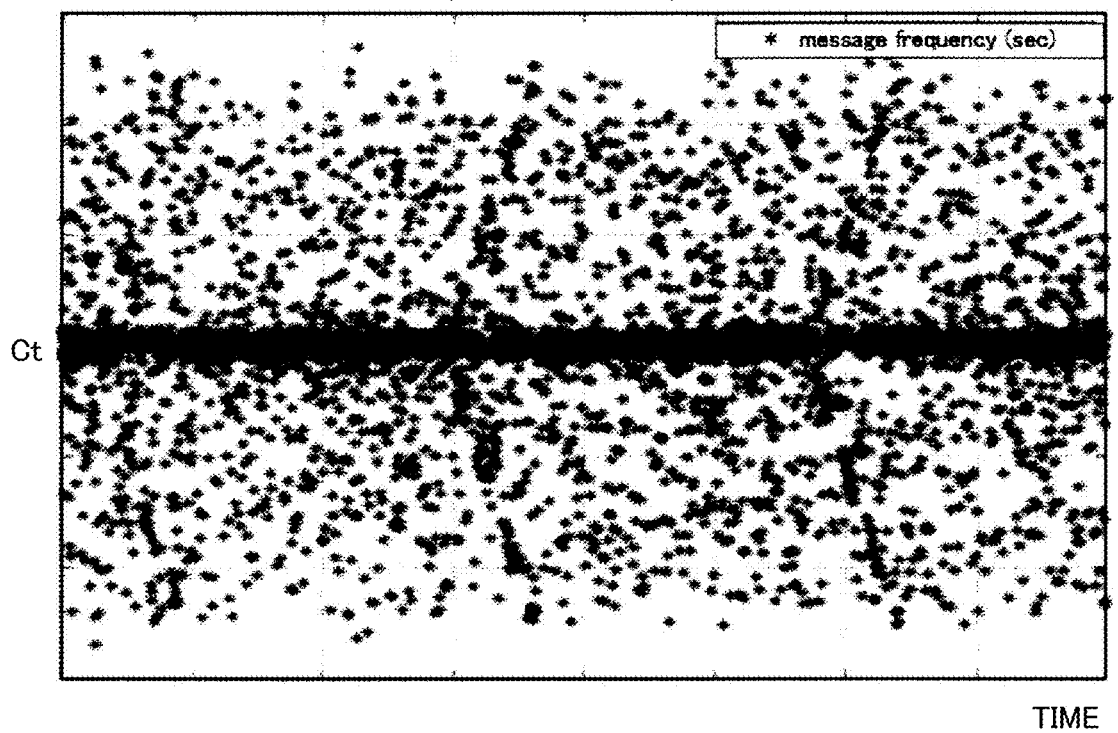
FIG. 4 is a diagram illustrating an example of a change in the transmission interval of a periodic message to be monitored over time in the vehicle-mounted detecting system according to the first embodiment of the disclosure.

FIG. 4 is a diagram illustrating an example of a change in the transmission interval of the periodic message to be monitored over time in the vehicle-mounted detecting system according to the first embodiment of the invention. In FIG. 4, the vertical axis indicates the transmission interval and the horizontal axis indicates time.

With reference to FIG. 4, the transmission interval is, for example, a timing interval at which a certain periodic message to be monitored (hereinafter, also referred to as a target message) is transmitted in the bus 13.

As illustrated in FIG. 4, the transmission interval of the target message is not constant and varies. The reason is that adjustment is performed in a case in which the target message is transmitted or a delay variation in internal processing occurs due to a clock shift.

Here, adjustment will be described. For example, priority is allocated to the message according to the ID. For example, in a case in which the transmission timings of a plurality of messages overlap each other, adjustment is performed in the vehicle-mounted network 12 such that a message with high priority is transmitted to the bus 13 preferentially over a message with low priority. A variation in the transmission interval occurs due to the adjustment.

Figure 5:
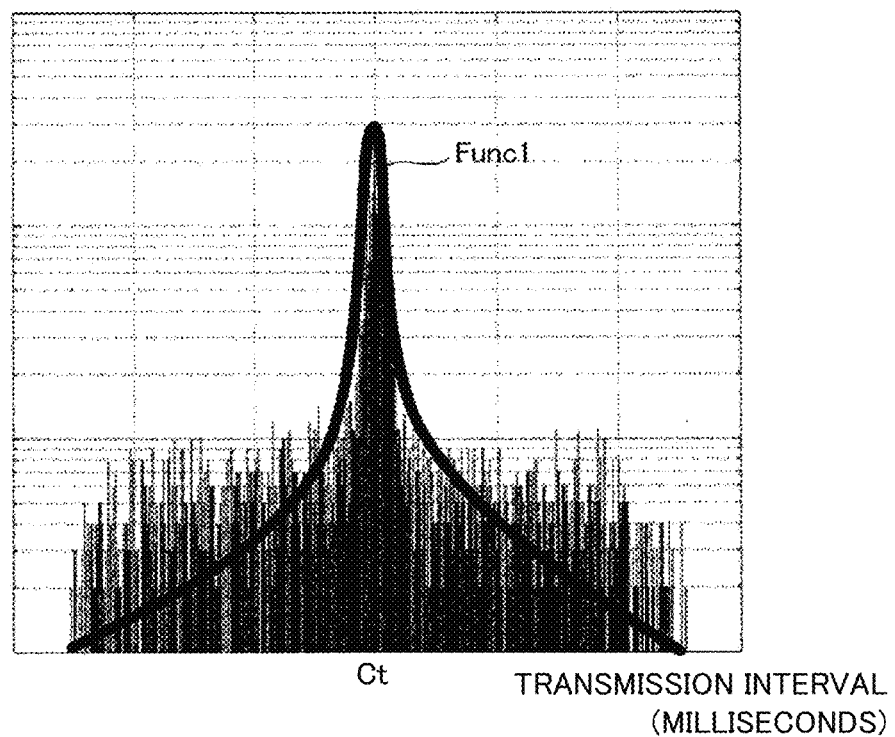
FIG. 5 is a diagram illustrating an example of a frequency distribution of the transmission intervals of a target message in the vehicle-mounted detecting system according to the first embodiment of the disclosure.

FIG. 5 is a diagram illustrating an example of the frequency distribution of the transmission intervals of the target message in the vehicle-mounted detecting system according to the first embodiment of the invention. In FIG. 5, the vertical axis indicates the frequency and the horizontal axis indicates the transmission interval.

With reference to FIG. 5, the frequency distribution of the transmission intervals is substantially symmetric with respect to Ct milliseconds. The frequency distribution of the transmission intervals can be approximated by, for example, a predetermined model function Func1.

With reference to FIG. 3, the monitoring unit 52 monitors a transmission message in the vehicle-mounted network 12. More specifically, the monitoring unit 52 monitors, for example, the message relay process of the communication processing unit 51 and measures the transmission interval of the target message on the basis of the monitoring result.

Specifically, for example, one ID (hereinafter, also referred to as a registered ID) indicating the target message is registered in the monitoring unit 52. In addition, a plurality of registered IDs may be registered in the monitoring unit 52.

For example, in a case in which the communication processing unit 51 receives a message, the monitoring unit 52 checks an ID included in the message received by the communication processing unit 51. In a case in which the checked ID is matched with the registered ID, the monitoring unit 52 stores the reception time t1 of the message received by the communication processing unit 51, that is, the target message as, for example, a measurement standard.

Then, in a case in which the communication processing unit 51 receives a new target message including a registered ID, the monitoring unit 52 stores the reception time t2 of the newly received target message and performs the following process.

That is, the monitoring unit 52 subtracts the reception time t1 from the reception time t2 to calculate the transmission interval of the target message and outputs the calculated transmission interval to the detecting unit 54.

The acquisition unit 53 acquires the distribution of the transmission intervals between the transmission messages. In detail, the acquisition unit 53 acquires, for example, distribution information indicating the distribution of the transmission intervals which has been created in advance by another device, specifically, a server.

More specifically, the server acquires, for example, a plurality of transmission intervals of the target message. The transmission interval is measured, for example, in a test vehicle which is the same type as the target vehicle. In addition, the server may acquire the transmission interval measured in the target vehicle.

For example, the server uses, as the model function Func1, a probability density function (hereinafter, also referred to as a normal distribution function) p of a normal distribution having a variable x which is represented by the following Expression (1).

[Expression 1]

$$p(x \mid \bar{x}, \sigma^2) = \frac{1}{\sqrt{2\pi\sigma^2}} \exp\left\{-\frac{(x-\bar{x})^2}{2\sigma^2}\right\} \quad (1)$$

Here, $\bar{x}$ and $\sigma^2$ are parameters and indicate the mean and variance of a plurality of transmission intervals, respectively. Here, "a^b" means the b-th power of a. In addition, $\bar{x}$ $\sigma^2$ are calculated by the following Expressions (2) and (3), respectively.

[Expression 2]

$$\bar{x} = \frac{1}{t} \sum_{i=1}^{t} x_i \quad (2)$$

[Expression 3]

$$\sigma^2 = \frac{1}{t} \sum_{i=1}^{t} (x_i - \bar{x})^2 \quad (3)$$

Here, t is the number of samples of the transmission interval. In addition, xi is an i-th transmission interval. For example, the server transmits distribution information including $\bar{x}$ and $\sigma^2$ to the target vehicle at a predetermined distribution timing.

In a case in which the distribution information is received from the server through the vehicle-mounted communication device 111 and the communication processing unit 51, the acquisition unit 53 creates the model function Func1 represented by Expression (1) on the basis of the received distribution information and outputs the created model function Func1 to the detecting unit 54.

The gateway device 101 has the configuration in which the acquisition unit 53 acquires the distribution information from the server through the vehicle-mounted communication device 111 and the communication processing unit 51 and outputs the distribution information to the detecting unit 54. However, the invention is not limited thereto. For example, the gateway device 101 may include a non-volatile memory and the acquisition unit 53 may acquire the distribution information from the non-volatile memory, to which the distribution information has been written through the port 112 by the terminal device for maintenance, and may output the distribution information to the detecting unit 54.

Figure 6:
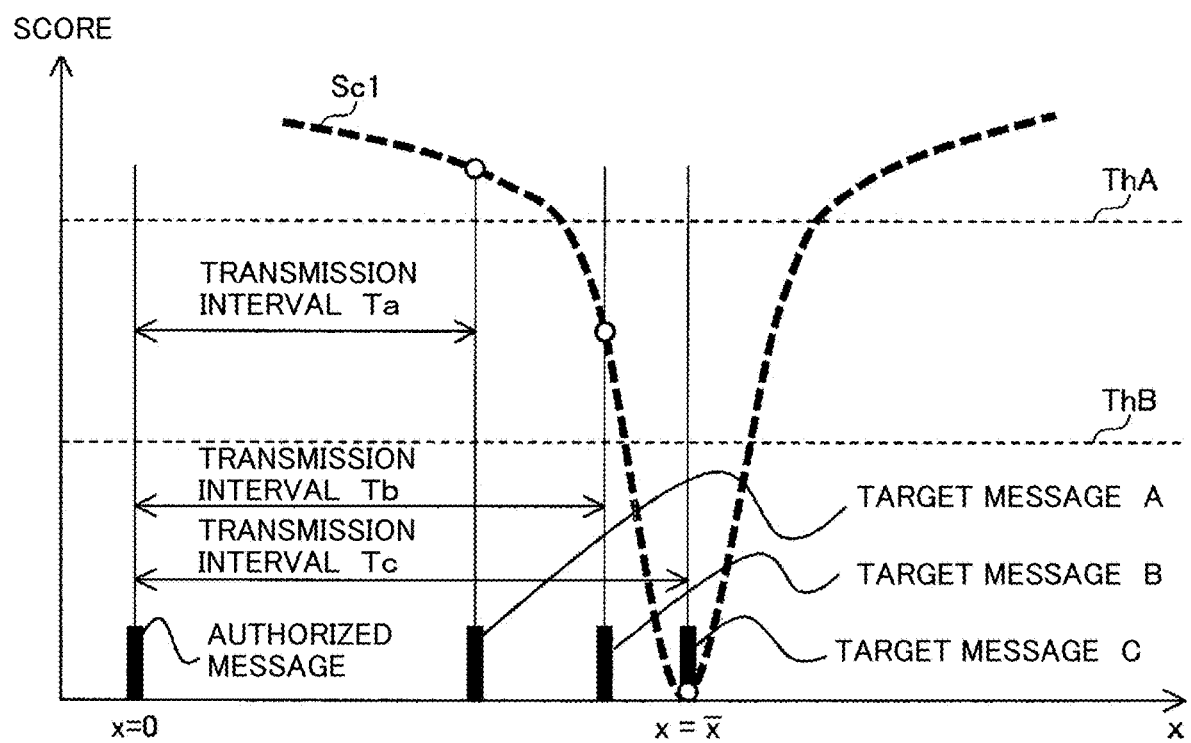
FIG. 6 is a diagram illustrating an example of the detection of an unauthorized message by a detecting unit in the gateway device according to the first embodiment of the disclosure.

FIG. 6 is a diagram illustrating an example of the detection of an unauthorized message by the detecting unit of the gateway device according to the first embodiment of the invention. In FIG. 6, the vertical axis indicates a score and the horizontal axis indicates the variable x.

With reference to FIG. 6, the detecting unit 54 detects an unauthorized message on the basis of the monitoring result of the monitoring unit 52 and the distribution of the transmission intervals acquired by the acquisition unit 53.

Specifically, the detecting unit 54 detects an unauthorized message on the basis of, for example, the transmission interval measured by the monitoring unit 52, the distribution information indicating the distribution of the transmission intervals, and a predetermined threshold. Here, a threshold ThB is registered in the detecting unit 54.

In other words, the detecting unit 54 detects an unauthorized message on the basis of, for example, a position in the distribution of the transmission intervals measured by the monitoring unit 52.

In a case in which the model function Func1 is received from the acquisition unit 53, the detecting unit 54 modifies the received model function Func1 to create a score function Sc1. Specifically, the detecting unit 54 creates, for example, −log(Func1) as the score function Sc1. Here, "log(c)" means the common logarithm of c.

In FIG. 6, the score function Sc1 is represented such that the time of the measurement standard is x=0. Therefore, in FIG. 6, the horizontal axis indicates the transmission interval. In addition, the score function Sc1 indicates the minimum value in a case in which the variable x is the mean, that is, $\bar{x}$.

The detecting unit 54 substitutes the transmission interval received from the monitoring unit 52 into the variable x of the score function Sc1 to calculate a score.

In a case in which the calculated score is equal to or less than, for example, the threshold ThB, the detecting unit 54 determines that the currently transmitted target message is an authorized message. Specifically, in a case in which a transmission interval Tc illustrated in FIG. 6 is received from the monitoring unit 52, the detecting unit 54 determines that a currently transmitted target message C is an authorized message.

The reason is as follows. For example, in a case in which the target message is an authorized message, the transmission interval is likely to be positioned in the vicinity of the center of the frequency distribution illustrated in FIG. 5 even though a variation caused by adjustment and the delay of internal processing is included.

On the other hand, in a case in which the calculated score is greater than the threshold ThB, the detecting unit 54 determines that the currently transmitted target message is an unauthorized message. Specifically, in a case in which a transmission interval Ta illustrated in FIG. 6 is received from the monitoring unit 52, the detecting unit 54 determines that a currently transmitted target message A is an unauthorized message. Similarly, in a case in which a transmission interval Tb is received from the monitoring unit 52, the detecting unit 54 determines that a currently transmitted target message B is an unauthorized message.

The reason is as follows. For example, in a case in which the target message is an unauthorized message, the transmission interval is unlikely to be transmitted according to a predetermined protocol.

In addition, in a case in which a security level is reduced, the threshold registered in the detecting unit 54 is changed to ThA greater than ThB. Therefore, for example, the message determined to be an unauthorized message by the detecting unit 54, such as the target message B corresponding to the transmission interval Tb, is determined to be an authorized message after the threshold is changed.

The detecting unit 54 notifies the monitoring unit 52 and the communication processing unit 51 of the determination result based on the transmission interval received from the monitoring unit 52.

For example, the monitoring unit 52 uses the reception timing of the transmission message determined not to be an unauthorized message as a measurement standard for the transmission interval.

Specifically, in a case in which the determination result notified by the detecting unit 54 indicates that the currently transmitted target message is an authorized message, the monitoring unit 52 uses a reception time t2 as a new measurement standard for the transmission interval.

Then, in a case in which the communication processing unit 51 receives a new target message including a registered ID, the monitoring unit 52 stores a reception time t3 of the newly received target message and performs the following process.

That is, the monitoring unit 52 subtracts the reception time t2 from the reception time t3 to calculate a new transmission interval of the target message and outputs the calculated transmission interval to the detecting unit 54.

In contrast, in a case in which the determination result notified by the detecting unit 54 indicates that the currently transmitted target message is an unauthorized message, the monitoring unit 52 maintains the reception time t1 as the measurement standard.

Then, in a case in which the communication processing unit 51 receives a new target message including a registered ID, the monitoring unit 52 stores the reception time t3 of the newly received target message and performs the following process.

That is, the monitoring unit 52 subtracts the reception time t1 from the reception time t3 to calculate a new transmission interval of the target message and outputs the calculated transmission interval to the detecting unit 54.

In addition, in a case in which the communication processing unit 51 receives the determination result notified by the detecting unit 54 and the content of the notification indicates that the currently transmitted target message is an unauthorized message, the communication processing unit 51 performs the following process.

That is, the communication processing unit 51 registers the unauthorized message indicated by the content of the notification and the target message received for a predetermined period before and after the unauthorized message. In addition, the communication processing unit 51 notifies a host device in the target vehicle or outside the target vehicle of the transmission of the unauthorized message through the bus 13.

Modification Example 1 of Gateway Device 101

Figure 7:
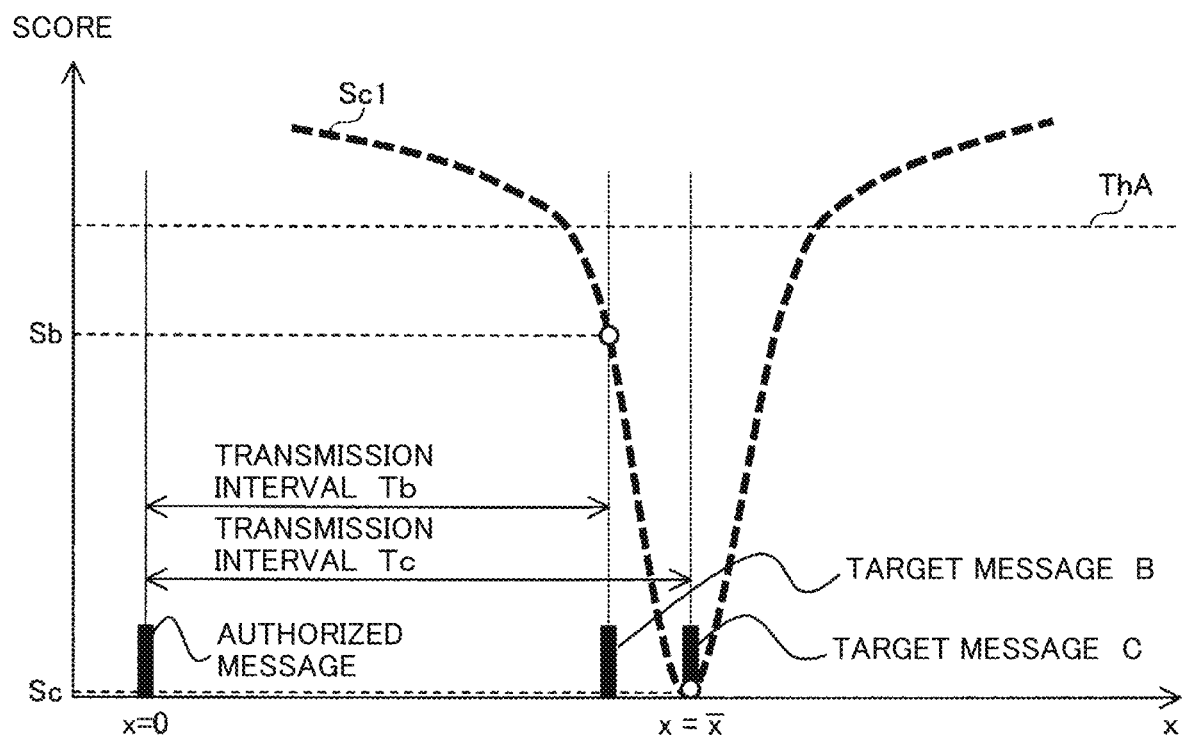
FIG. 7 is a diagram illustrating an example of the detection of the unauthorized message by the detecting unit in the gateway device according to the first embodiment of the disclosure.

FIG. 7 is a diagram illustrating an example of the detection of an unauthorized message by the detecting unit of the gateway device according to the first embodiment of the invention. In FIG. 7, the vertical axis indicates a score and the horizontal axis indicates the variable x.

With reference to FIG. 7, for example, in a case in which the communication processing unit 51 receives both the target message B and the target message C and the threshold is set to ThA, the target message B is determined to be an authorized message and the target message C with a smaller score is determined to be an unauthorized message. As a result, the reception time of the target message B is set as a new measurement standard, which is not preferable.

In contrast, for example, the monitoring unit 52 accumulates two transmission intervals measured by the same measurement standard and then outputs the accumulated two transmission intervals to the detecting unit 54. In addition, the monitoring unit 52 may accumulate three or more transmission intervals measured by the same measurement standard and then output the accumulated transmission intervals to the detecting unit 54.

Specifically, the monitoring unit 52 stores the reception time t1 as the measurement standard. Then, in a case in which the communication processing unit 51 receives a target message including a registered ID, the monitoring unit 52 stores the reception time t2 of the received target message.

Then, in a case in which the communication processing unit 51 receives a new target message including a registered ID, the monitoring unit 52 stores the reception time t3 of the received new target message.

The monitoring unit 52 subtracts the reception time t1 from the reception time t2 to calculate the transmission interval Tb. In addition, the monitoring unit 52 subtracts the reception time t1 from the reception time t3 to calculate the transmission interval Tc. The monitoring unit 52 outputs the calculated transmission intervals Tb and Tc to the detecting unit 54.

In a case in which the transmission intervals Tb and Tc are received from the monitoring unit 52, the detecting unit 54 substitutes each of the received transmission intervals Tb and Tc into the variable x of the score function Sc1 to calculate scores Sb and Sc.

Since both the calculated scores Sb and Sc are equal to or less than the threshold ThA and the score Sc is less than the score Sb, the detecting unit 54 performs the following determination.

That is, the detecting unit 54 determines that the target message B corresponding to the score Sb is an unauthorized message and determines that the target message C corresponding to the score Sc is an authorized message.

The detecting unit 54 notifies the monitoring unit 52 and the communication processing unit 51 of the determination result based on the transmission intervals Tb and Tc received from the monitoring unit 52.

In a case in which the determination result notified by the detecting unit 54 indicates that the target message C is an authorized message, the monitoring unit 52 uses the reception time t3 as a new measurement standard for the transmission interval. This configuration makes it possible to more appropriately set the measurement standard.

Modification Example 2 of Gateway Device 101

Figure 8:
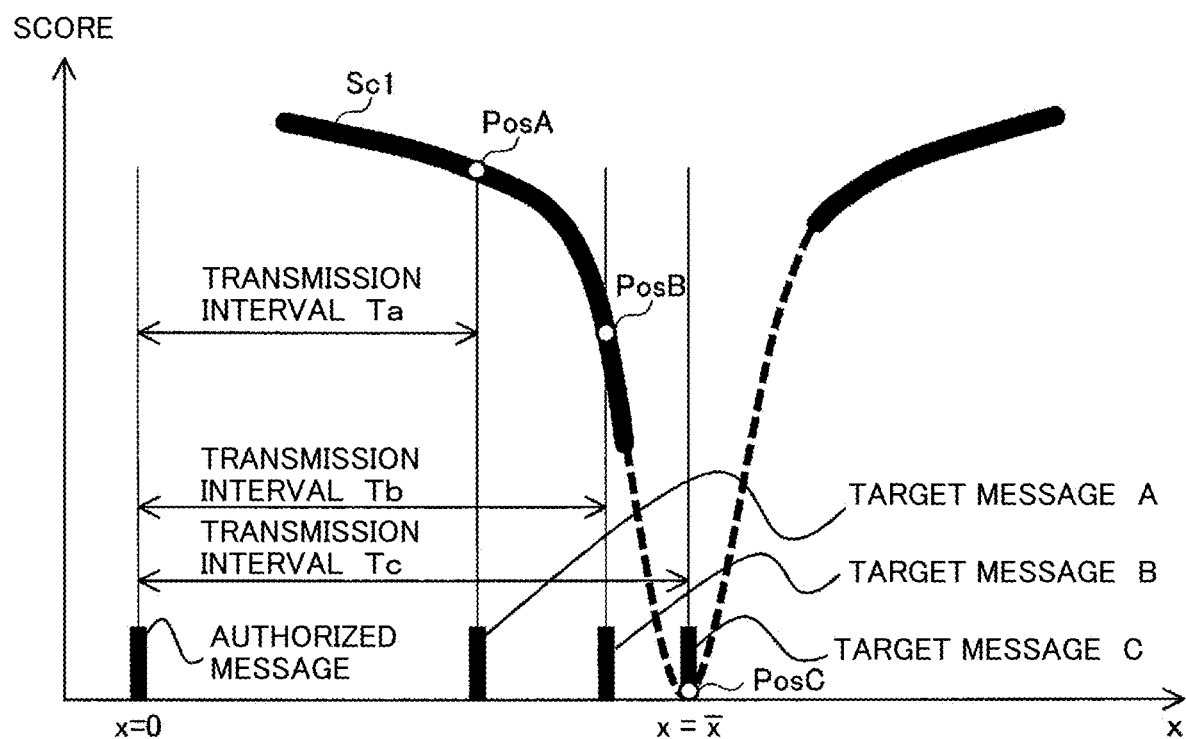
FIG. 8 is a diagram illustrating an example of the detection of the unauthorized message by the detecting unit in the gateway device according to the first embodiment of the disclosure.

FIG. 8 is a diagram illustrating an example of the detection of an unauthorized message by the detecting unit of the gateway device according to the first embodiment of the invention. In FIG. 8, the vertical axis indicates a score and the horizontal axis indicates the variable x.

With reference to FIG. 8, the detecting unit 54 detects an unauthorized message using the threshold, as illustrated in FIGS. 6 and 7. However, the invention is not limited thereto.

For example, in a case in which the position of the transmission interval in the score function Sc1 is present in a region (hereinafter, also referred to as an unauthorized region) of the score function Sc1 which is represented by a thick line, the detecting unit 54 determines that the currently transmitted target message is an unauthorized message.

Specifically, in a case in which the position of the transmission interval in the score function Sc1 is PosA and PosB, the detecting unit 54 determines that the currently transmitted target messages A and B are unauthorized messages.

In contrast, for example, in a case in which the position of the transmission interval in the score function Sc1 is present in a region of the score function Sc1 which is represented by a dotted line, the detecting unit 54 determines that the currently transmitted target message is an authorized message.

Specifically, in a case in which the position of the transmission interval in the score function Sc1 is PosC, the detecting unit 54 determines that the currently transmitted target message C is an authorized message.

In FIG. 8, the unauthorized region is asymmetric with respect to a straight line of $x=\bar{x}$. However, the invention is not limited thereto. The unauthorized region may be symmetric with respect to the straight line of $x=\bar{x}$. In this case, the same detection result as the detection result of the unauthorized message using the thresholds illustrated in FIGS. 6 and 7 is obtained.

Modification Example 3 of Gateway Device 101

It is considered that a variation in the transmission interval occurs due to a combination of a plurality of causes, such as adjustment and a delay variation in internal processing, as described above. Therefore, it is expected that, instead of the single normal distribution function represented by Expression (1), a function obtained by overlapping a plurality of Gaussian functions will be used as a model function to more accurately represent the actual variation in the transmission interval.

For example, the server uses, as the model function Func2, a mixed normal distribution function P having a variable x which is represented by the following Expression (4).

[Expression 4]

$$P(x \mid c_k, \bar{x}_k, \sigma_k^2) = \sum_{1}^{K} c_k p(x \mid \bar{x}_k, \sigma_k^2) \tag{4}$$

Here, K, $c_k$, $\bar{x}_k$, and $\sigma_k^2$ are parameters and indicate the number of mixed normal distributions, the mixture ratio of a k-th normal distribution function p, the mean of a k-th normal distribution, and the variance of the k-th normal distribution, respectively. Here, k is an integer in the range of 1 to K.

In addition, the k-th normal distribution function p in Expression (4) is represented by the following Expression (5).

[Expression 5]

$$p(x \mid \bar{x}_k, \sigma_k^2) = \frac{1}{\sqrt{2\pi\sigma_k^2}} \exp\left\{-\frac{(x-\bar{x})^2}{2\sigma^2}\right\} \tag{5}$$

In addition, $c_k$, $\bar{x}_k$, and $\sigma_k^2$ are calculated as follows by the EM algorithm disclosed in Non-Patent Document 1 (Dempster, A. P., two others, "Maximum likelihood from incomplete data via the EM algorithm", Journal of Royal Statistical Society B, Col. 39, P. 1-22, 1977). That is, the server repeatedly performs the following E and M steps to converge the calculation results.

More specifically, in the E step, the server calculates a sufficient statistic $S_i(s)$ and an i-th burden ratio $\gamma_i(s)$ using the following Expressions (6) and (7), respectively.

[Expression 6]

$$S_i^{(s)} = \frac{1}{t}\left(\sum_{u=1}^{t} \gamma_i^{(s)}, \sum_{u=1}^{t} \gamma_i^{(s)} \cdot y_u, \sum_{u=1}^{t} \gamma_i^{(s)} \cdot y_u \cdot y_u^T\right) \tag{6}$$

-continued

[Expression 7]

$$\gamma_i^{(s)} = \frac{c_i^{(s-1)} p(y_u)}{\sum_{i=1}^{K} c_i^{s-1} p(y_u)} \quad (7)$$

Here, yu and t indicate data, that is, the transmission interval and the number of samples, respectively. In addition, ci(s−1) indicates an i-th mixture ratio in the previous E step.

In the M step, the server calculates an i-th mixture ratio ci(s), an i-th mean $\bar{x}_i$(s), and an i-th variance σi^2(s) using the following Expressions (8), (9), and (10), respectively.

[Expression 8]

$$c_i^{(s)} = \gamma_i^{(s)} \quad (8)$$

[Expression 9]

$$\bar{x}_i^{(s)} = \frac{\gamma_i^{(s)} \cdot y_u}{c_i^{(s)}} \quad (9)$$

[Expression 10]

$$\sigma_i^{2(s)} = \frac{\gamma_i^{(s)} \cdot y_u y_u^T}{c_i^{(s)}} + \bar{x}_i^{(s)} \bar{x}_i^{(s)T} \quad (10)$$

For example, the server transmits distribution information including K, c1 to cK, $\bar{x}_1$ to $\bar{x}_k$, and σ1^2 to σK^2 to the target vehicle at a predetermined distribution timing.

In a case in which the distribution information is received from the server through the vehicle-mounted communication device 111 and the communication processing unit 51, the acquisition unit 53 creates the model function Func2 represented by Expression (4) on the basis of the received distribution information and outputs the created model function Func2 to the detecting unit 54.

In a case in which the model function Func2 is received from the acquisition unit 53, the detecting unit 54 detects an unauthorized message, using the received model function Func2 in the same way as the model function Func1.

[Operation]

Each device in the vehicle-mounted detecting system 301 includes a computer. An arithmetic processing unit, such as a CPU, in the computer reads each program including some or all of the steps in the following sequence diagram or flowchart from a memory (not illustrated) and executes the program. Each of the programs of a plurality of devices can be installed from the outside. Each of the programs of the plurality of devices is stored in a recording medium and is then distributed.

Figure 9:
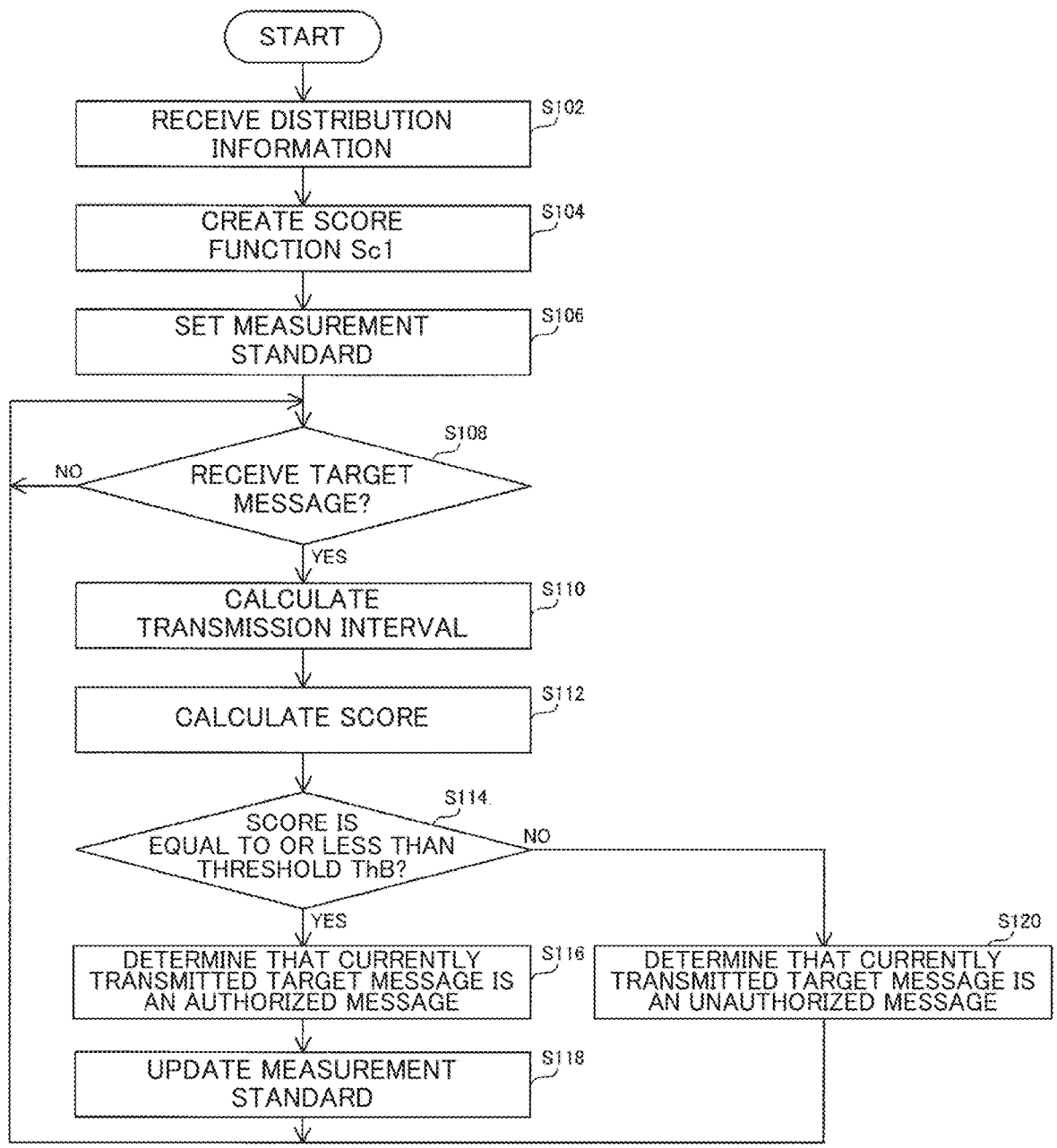
FIG. 9 is a flowchart illustrating the procedure of an operation in a case in which the gateway device according to the first embodiment of the disclosure detects the unauthorized message on the basis of the transmission interval.

FIG. 9 is a flowchart illustrating the procedure of an operation in a case in which the gateway device according to the first embodiment of the invention detects an unauthorized message on the basis of the transmission interval.

With reference to FIG. 9, first, the gateway device 101 receives distribution information from, for example, the server (Step S102).

Then, the gateway device 101 creases the model function Func1 on the basis of the received distribution information and modifies the created model function Func1 to create the score function Sc1 (Step S104).

Then, the gateway device 101 receives an initial target message and sets the reception time of the target message as the measurement standard (Step S106).

Then, the gateway device 101 waits until the target message is received (NO in Step S108).

Then, in a case in which the target message is received (YES in Step S108), the gateway device 101 subtracts the measurement standard from the reception time to calculate the transmission interval (Step S110).

Then, the gateway device 101 substitutes the calculated transmission interval into the score function Sc1 to calculate a score (Step S112).

Then, in a case in which the calculated score is equal to or less than the threshold ThB (YES in Step S114), the gateway device 101 determines that the currently transmitted target message is an authorized message (Step S116).

Then, the gateway device 101 updates the measurement standard to the reception time of the currently transmitted target message (Step S118).

On the other hand, in a case in which the calculated score is greater than the threshold ThB (NO in Step S114), the gateway device 101 determines that the currently transmitted target message is an unauthorized message (Step S120).

Then, in a case in which the measurement standard is updated (Step S118) or in a case in which the target message is determined to be an unauthorized message (Step S120), the gateway device 101 waits until a new target message is received (NO in Step S108).

In the vehicle-mounted detecting system according to the first embodiment of the invention, the gateway device 101 detects an unauthorized message in the vehicle-mounted network 12. However, the invention is not limited thereto. In the vehicle-mounted detecting system 301, a detecting device different from the gateway device 101 may detect an unauthorized message in the vehicle-mounted network 12.

Further, in the gateway device according to the first embodiment of the invention, the monitoring unit 52 measures the transmission interval on the basis of the reception time of the target message. However, the invention is not limited thereto. For example, the monitoring unit 52 may acquire the transmission time of the target message and measure the transmission interval on the basis of the acquired transmission time.

In addition, in the gateway device according to the first embodiment of the invention, the detecting unit 54 detects whether the message exchanged between the control devices 122 is an unauthorized message. However, the invention is not limited thereto. For example, the detecting unit 54 may detect whether the message exchanged between the control device 122 and the vehicle-mounted communication device 111 and the message exchanged between the vehicle-mounted communication devices 111 are unauthorized messages.

Furthermore, in the vehicle-mounted detecting system according to the first embodiment of the invention, the gateway device 101 functioning as the detecting device is directly connected to the bus 13. However, the invention is not limited thereto.

Figure 10:
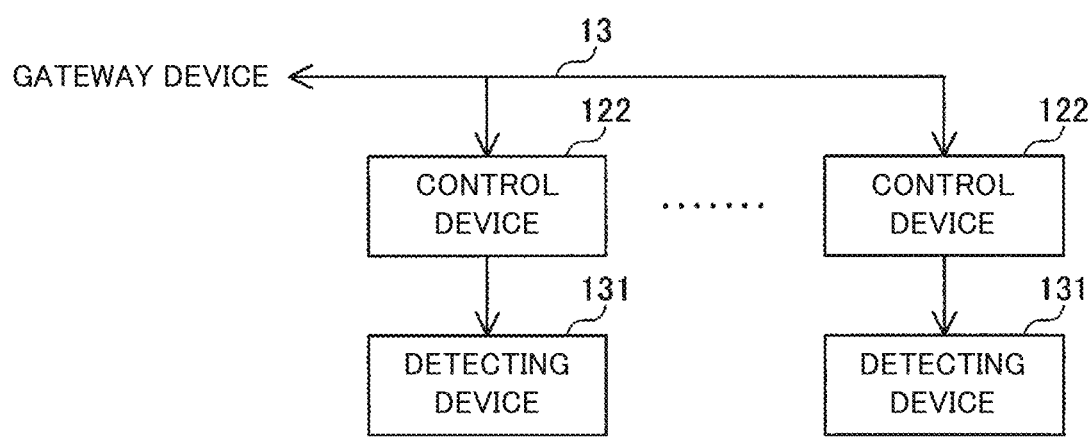
FIG. 10 is a diagram illustrating an example of the connection topology of the vehicle-mounted network according to the first embodiment of the disclosure.

FIG. 10 is a diagram illustrating an example of the connection topology of the vehicle-mounted network according to the first embodiment of the invention.

With reference to FIG. 10, a detecting device 131 may be connected to the bus 13 through a vehicle-mounted device, for example, the control device 122. In this case, the detecting device 131 monitors, for example, the target message which is transmitted from and received by the vehicle-mounted device to detect an unauthorized message transmitted to the bus 13.

In addition, the gateway device 101 according to the first embodiment of the invention acquires the distribution of the transmission intervals of the target message measured in the test vehicle. However, the invention is not limited thereto. The gateway device 101 may accumulate the transmission interval measured in the target vehicle and create the distribution on the basis of the accumulated transmission interval. However, in this configuration, a large-capacity memory for accumulating the measured transmission interval is required. Therefore, this configuration is unlikely to be suitable for the gateway device 101 requiring a small size and a low cost. A configuration in which the distribution can be created with a small-capacity memory will be described below.

Patent Document 1 discloses the configuration in which the first encryption key used for message authentication by the first ECU and the second ECU connected only to the vehicle-mounted network and the second encryption key used by the third ECU connected to both the vehicle-mounted network and the network outside the vehicle are different from each other to prevent cyber attacks against the first and second ECUs that are not connected to the network outside the vehicle from the network outside the vehicle.

However, in security measures using message authentication, the security measures are likely to be invalidated by, for example, attacks that exploit protocol vulnerability, attacks by the illegal acquisition of the first encryption key, and attacks that exploit the obsolescence of encryption algorithms.

In this case, a technique for accurately detecting the intrusion of an attacker into the vehicle-mounted network is required.

In contrast, the detecting device according to the first embodiment of the invention detects an unauthorized message in the vehicle-mounted network 12 including a plurality of vehicle-mounted devices. The monitoring unit 52 monitors a transmission message in the vehicle-mounted network 12. The acquisition unit 53 acquires the distribution of the transmission intervals between the transmission messages. Then, the detecting unit 54 detects an unauthorized message on the basis of the monitoring result of the monitoring unit 52 and the distribution acquired by the acquisition unit 53.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

In addition, the gateway device according to the first embodiment of the invention relays messages between the vehicle-mounted devices in the vehicle-mounted network 12. The monitoring unit 52 monitors the transmission message in the vehicle-mounted network 12. The acquisition unit 53 acquires the distribution of the transmission intervals between the transmission messages. Then, the detecting unit 54 detects an unauthorized message on the basis of the monitoring result of the monitoring unit 52 and the distribution acquired by the acquisition unit 53.

For example, in a case in which an authorized transmission message is periodically transmitted, the frequency of the distribution is concentrated in the vicinity of the transmission period of the authorized transmission message. Therefore, the transmission interval in the range in which the frequency is low in the distribution is highly likely to be the transmission interval of an unauthorized message. Thus, a transmission message with the transmission interval in the range in which the frequency is low can be detected as an unauthorized message. As a result, it is possible to accurately detect an unauthorized message in the vehicle-mounted network. In addition, the configuration using the distribution of the transmission intervals between the transmission messages makes it possible to perform accurate detection considering a variation in the transmission interval between the transmission messages.

In addition, in the gateway device according to the first embodiment of the invention, the monitoring unit 52 measures the transmission interval between the transmission messages. Then, the detecting unit 54 detects an unauthorized message on the basis of the transmission interval measured by the monitoring unit 52, the distribution, and a predetermined threshold.

With this configuration, the range of the transmission interval in which the transmission message is determined to be an unauthorized message in the distribution can be determined by the threshold. Therefore, it is possible to easily determine whether the transmission message is an unauthorized message.

Further, in the gateway device according to the first embodiment of the invention, the monitoring unit 52 measures the transmission interval between the transmission messages. Then, the detecting unit 54 detects an unauthorized message on the basis of a position in the distribution of the transmission intervals measured by the monitoring unit 52.

For example, this configuration makes it possible to easily determine whether the transmission message is an unauthorized message in a case in which the range of the transmission interval in which the transmission message is determined to be an unauthorized message in the distribution is determined.

Furthermore, in the gateway device according to the first embodiment of the invention, the acquisition unit 53 acquires the distribution which has been created in advance by another device.

As such, the processing load of the gateway device 101 can be reduced by the configuration in which another device performs the distribution creation process whose processing load is large.

In addition, in the gateway device according to the first embodiment of the invention, the monitoring unit 52 measures the transmission interval between the transmission messages. Then, the monitoring unit 52 uses the reception timing of the transmission message determined not to be an unauthorized message as the measurement standard for the transmission interval.

For example, this configuration makes it possible to prevent a situation in which the measurement standard is set to the reception timing of an unauthorized message, the transmission interval between the reception timing of the unauthorized message and the reception timing of an authorized transmission message is measured after the setting, and the authorized transmission message is erroneously detected as the unauthorized message.

Next, other embodiments of the invention will be described with reference to the drawings. In the drawings, the same or equivalent portions are denoted by the same reference numerals and the description thereof will not be repeated.

Second Embodiment

This embodiment relates to a gateway device which differs from the gateway device according to the first embodiment in that distribution parameters are dynamically set. The gateway device according to the second embodiment is the same as the gateway device according to the first embodiment except the following content.

Figure 11:
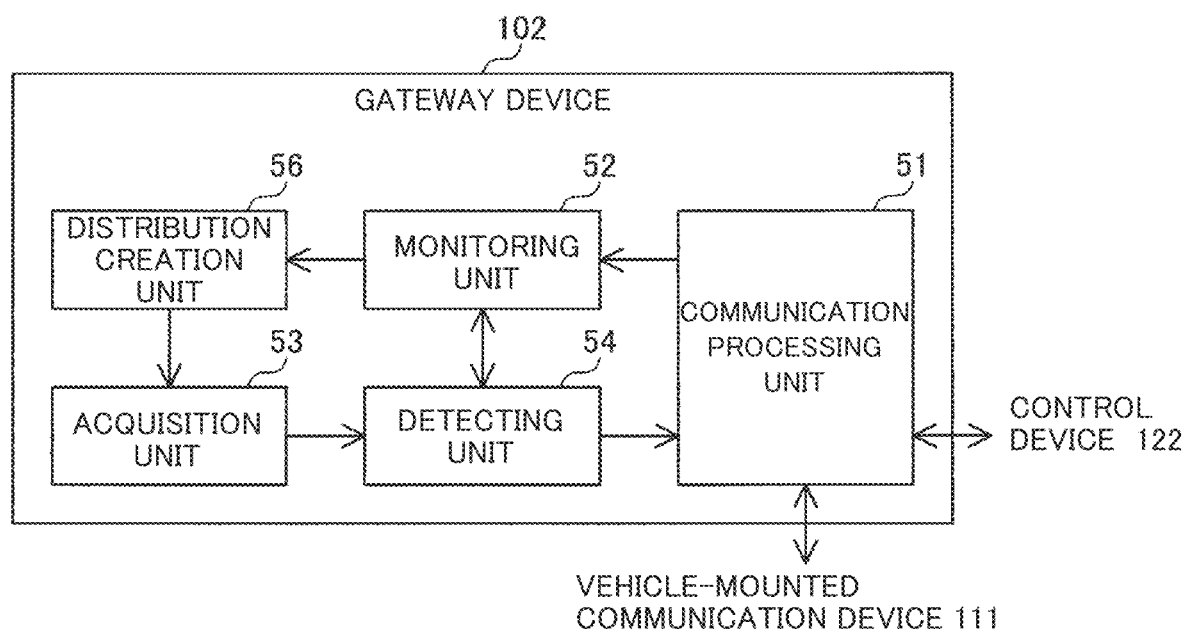
FIG. 11 is a diagram illustrating the configuration of a gateway device in a vehicle-mounted detecting system according to a second embodiment of the disclosure.

FIG. 11 is a diagram illustrating the configuration of the gateway device in a vehicle-mounted detecting system according to the second embodiment of the invention.

With reference to FIG. 11, a gateway device 102 includes a communication processing unit 51, a monitoring unit 52, an acquisition unit 53, a detecting unit 54, and a distribution creation unit 56.

The operations of the communication processing unit 51, the monitoring unit 52, the acquisition unit 53, and the detecting unit 54 in the gateway device 102 are the same as the operations of the communication processing unit 51, the monitoring unit 52, the acquisition unit 53, and the detecting unit 54 in the gateway device 101 illustrated in FIG. 3, respectively.

For example, the monitoring unit 52 monitors a message relay process of the communication processing unit 51 and calculates the transmission interval of a target message on the basis of the monitoring result. Then, the monitoring unit 52 outputs the calculated transmission interval to the detecting unit 54 and the distribution creation unit 56.

For example, the distribution creation unit 56 updates distribution information indicating the distribution of the transmission intervals on the basis of the transmission interval measured by the monitoring unit 52.

More specifically, the distribution creation unit 56 uses, for example, the normal distribution function p represented by Expression (1) as the model function Func1. For example, the distribution creation unit 56 updates the parameters of the normal distribution function p using a Welford-Knuth method disclosed in Non-Patent Document 2 (B. P. Welford, "Note on a method for calculating corrected sums of squares and products", Technometrics, Vol. 4, P. 419-420, 1962) and Non-Patent Document 3 (D. E. Knuth, "The Art Of Computer Programming Volume 2 Seminumerical Algorithms Third Edition", P. 219, 2015) whenever the transmission interval is received from the monitoring unit 52.

Specifically, for example, the distribution creation unit 56 stores the number of calculation operations m indicating the number of times the transmission interval is received from the monitoring unit 52 and increments the number of calculation operations m whenever the transmission interval is received from the monitoring unit 52.

The distribution creation unit 56 calculates $\bar{x}_m$ and $M_m$, using the following Expressions (11) and (12), respectively.

[Expression 11]

$$\bar{x}_m = \frac{x_m - \bar{x}_{m-1}}{m} + \bar{x}_{m-1} \quad (11)$$

[Expression 12]

$$M_m = M_{m-1} + (x_m - \bar{x}_{m-1})(x_m - \bar{x}_m) \quad (12)$$

Here, $\bar{x}_h$ and $M_h$ indicate a mean in an h-th calculation operation and a square sum mean in the h-th calculation operation, respectively. Here, h is m or m−1. In addition, the distribution creation unit 56 calculates a variance $\sigma^2$ using the following Expression (13).

[Expression 13]

$$\sigma^2 = \frac{M_m}{m-1} \quad (13)$$

For example, the distribution creation unit 56 outputs distribution information including the calculated $\bar{x}_m$ and $\sigma^2$ to the acquisition unit 53.

For example, the acquisition unit 53 acquires the distribution of the transmission intervals of the target message based on the monitoring result of the monitoring unit 52.

More specifically, in a case in which the distribution information is received from the distribution creation unit 56, the acquisition unit 53 creates the model function Func1 represented by Expression (1) on the basis of the received distribution information and outputs the created model function Func1 to the detecting unit 54.

For example, the detecting unit 54 detects an unauthorized message on the basis of the monitoring result of the monitoring unit 52 and the distribution of the transmission intervals updated by the distribution creation unit 56.

More specifically, the detecting unit 54 receives the model function Func1 from the acquisition unit 53 and receives the transmission interval from the monitoring unit 52.

For example, the detecting unit 54 creates, for example, −log(Func1) as the score function Sc1 and substitutes the transmission interval into the variable x of the created score function Sc1 to calculate a score.

The detecting unit 54 compares the calculated score with a threshold and determines whether the currently transmitted target message is an authorized message or an unauthorized message on the basis of the magnitude relationship between the score and the threshold. The detecting unit 54 notifies the monitoring unit 52 and the communication processing unit 51 of the determination result.

Modification Example 1 of Gateway Device 102

In this example, the gateway device 102 which uses Expression (4) as the model function Func2 and dynamically sets the parameters of a corresponding distribution will be described.

The distribution creation unit 56 uses, for example, the mixed normal distribution function P represented by Expression (4) as the model function Func2. For example, the distribution creation unit 56 dynamically sets, that is, updates c1 to cK, $\bar{x}_1$ to $\bar{x}_K$, and $\sigma1^2$ to $\sigma K^2$, using a Stepwise-EM method disclosed in Non-Patent Document 4 (O. Cappe and one other, "Online expectation maximization algorithm for latent data models", Journal of the Royal Statistics Society: Series B (Statistical Methodology), Vol. 71, P. 593-613, 2009), whenever the transmission interval is received from the monitoring unit 52.

More specifically, in the E step and the M step, the distribution creation unit 56 applies the Stepwise-EM method to i=1 to K to calculate $c_i$, $\bar{x}_i$, and $\sigma i^2$.

Specifically, in the E step, the distribution creation unit 56 calculates an attenuation coefficient $\eta t$ using the following Expression (14).

[Expression 14]

$$\eta_t = (m)^{-\alpha} \quad (14)$$

In addition, the distribution creation unit 56 calculates an i-th burden ratio γi(s) using the following Expression (15).

[Expression 15]

$$\gamma_i^{(s)} = \frac{c_i^{(s-1)} p(y_u)}{\sum_{i=1}^{K} c_i^{s-1} p(y_u)} \quad (15)$$

The distribution creation unit 56 calculates a sufficient statistic Si(s) and an updated sufficient statistic S(s) using the following Expressions (16) and (17), respectively.

[Expression 16]

$$s_i^{(s)} = (\gamma_i^{(s)}, \gamma_i^{(s)} \cdot y_u, \gamma_i^{(s)} \cdot y_u y_u^T) \quad (16)$$

[Expression 17]

$$s^{(s)} = (1-\eta_t) s^{(s-1)} + \eta_t s_i^{(s)} \quad (17)$$

Here, s(s−1) is a sufficient statistic in the previous E step.

In the M step, the distribution creation unit 56 calculates an i-th mixture ratio ci(s), an i-th mean $\bar{x}_i(s)$, and an i-th variance σi^2(s) using the following Expressions (18), (19), and (20), respectively.

[Expression 18]

$$c_i^{(s)} = \gamma_i^{(s)} \quad (18)$$

[Expression 19]

$$\bar{x}_i^{(s)} = \frac{\gamma_i^{(s)} \cdot y_u}{c_i^{(s)}} \quad (19)$$

[Expression 20]

$$\sigma_i^{2(s)} = \frac{\gamma_i^{(s)} \cdot y_u y_u^T}{c_i^{(s)}} + \bar{x}_i^{(s)} \bar{x}_i^{(s)T} \quad (20)$$

Then, the distribution creation unit 56 calculates the following Expression (21) to increment the number of calculation operations m.

[Expression 21]

$$m = m+1 \quad (21)$$

The distribution creation unit 56 outputs distribution information including, for example, K and the calculated c1 to cK, $\bar{x}_1$ to $\bar{x}_K$, and σ1^2 to σK^2 to the acquisition unit 53.

In a case in which the distribution information is received from the distribution creation unit 56, the acquisition unit 53 creates the model function Func2 represented by Expression (4) on the basis of the received distribution information and outputs the created model function Func2 to the detecting unit 54.

The detecting unit 54 receives the model function Func2 from the acquisition unit 53 and receives the transmission interval from the monitoring unit 52.

For example, the detecting unit 54 creates, for example, −log(Func2) as the score function Sc1 and substitutes the transmission interval into the variable x of the created score function Sc1 to calculate a score.

The detecting unit 54 compares the calculated score with a threshold and determines whether the currently transmitted target message is an authorized message or an unauthorized message on the basis of the magnitude relationship between the score and the threshold. The detecting unit 54 notifies the monitoring unit 52 and the communication processing unit 51 of the determination result.

In addition, in the gateway device 102, the distribution creation unit 56 updates c1 to cK, $\bar{x}_1$ to $\bar{x}_K$, and σ1^2 to σK^2 whenever the transmission interval is received from the monitoring unit 52. However, the invention is not limited thereto.

For example, the distribution creation unit 56 may update c1 to cK, $\bar{x}_1$ to $\bar{x}_K$, and σ1^2 to σK^2 for each minibatch-size of 100 to 200.

More specifically, for example, in a case in which the minibatch-size is 100, the distribution creation unit 56 performs the E step 100 times and then performs the M step one time.

As such, for example, this configuration using a minibatch-size of 100 to 200 makes it possible to stably converge each calculation result in the E step and to stably update c1 to cK, $\bar{x}_1$ to $\bar{x}_K$, and σ1^2 to σK^2 after the convergence.

[Effect]

Figure 12:
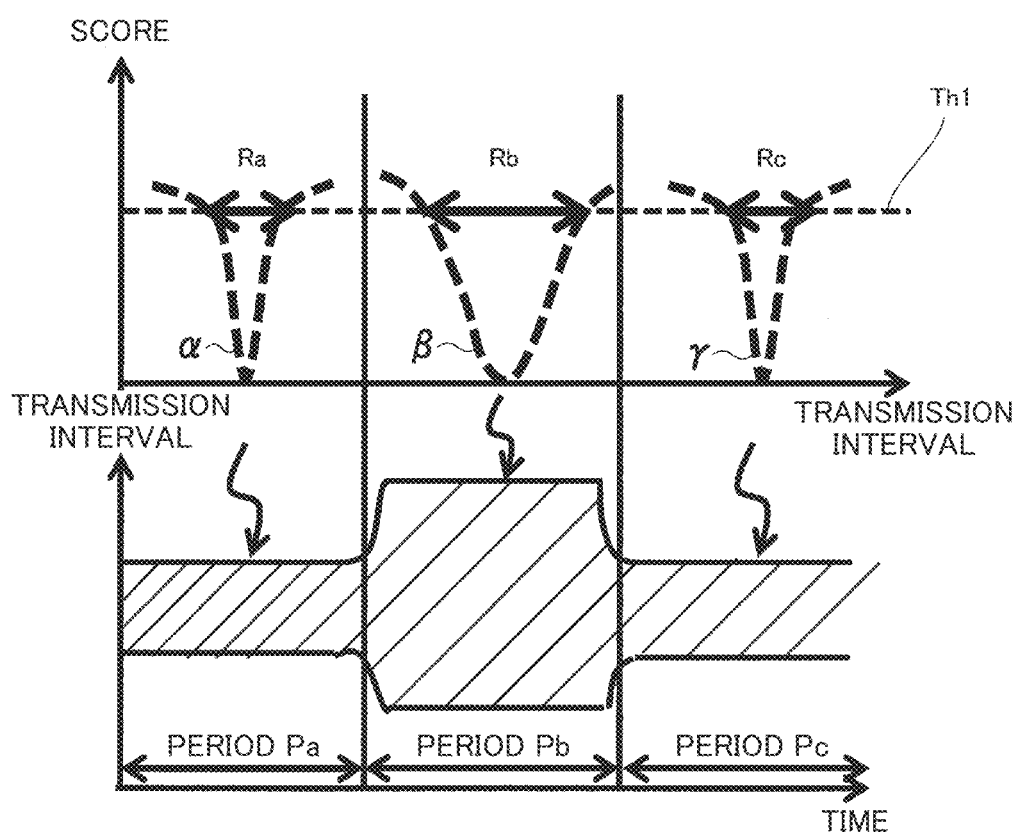
FIG. 12 is a diagram illustrating the effect of the dynamic setting of parameters in the gateway device according to the second embodiment of the disclosure.

FIG. 12 is a diagram illustrating the effect of the dynamic setting of the parameters in the gateway device according to the second embodiment of the invention. In FIG. 12, the vertical axis indicates the score and the transmission interval and the corresponding horizontal axes indicate the transmission interval and time.

With reference to FIG. 12, for example, a situation in which the degree of variation in the transmission interval is changed for periods Pa, Pb, and Pc is assumed. More specifically, the score functions corresponding to the periods Pa, Pb, and Pc are α, β, and γ, respectively.

For example, in a case in which the threshold Th1 is constant for the periods Pa, Pb, and Pc as illustrated in FIG. 12, the ranges Ra and Rc (hereinafter, also referred to as normal ranges) of the transmission interval in which the currently transmitted target message is determined to be an authorized message are narrow for the periods Pa and Pc for which a variation in the transmission interval is small. In contrast, a normal range Rb is wide for the period Pb for which a variation in the transmission interval is large. Therefore, it is possible to change the normal range depending on the degree of variation in the transmission period. As a result, it is possible to set an appropriate criterion for determination.

[Operation]

Figure 13:
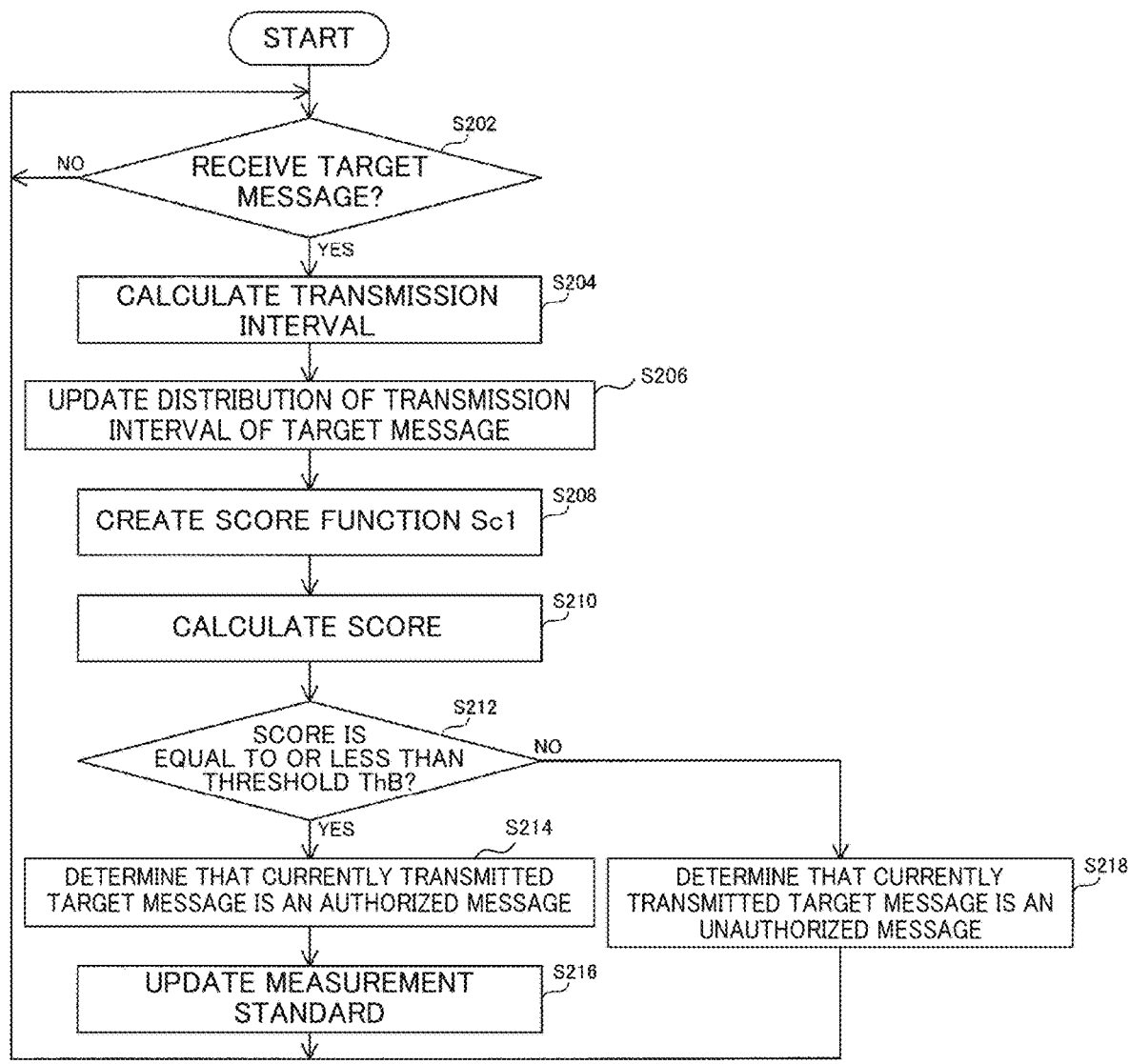
FIG. 13 is a flowchart illustrating the procedure of an operation in a case in which the gateway device according to the second embodiment of the disclosure detects an unauthorized message on the basis of a transmission interval.

FIG. 13 is a flowchart illustrating the procedure of an operation in a case in which the gateway device according to the second embodiment of the invention detects an unauthorized message on the basis of the transmission interval.

With reference to FIG. 13, a situation in which the gateway device 102 stores a measurement standard for the transmission interval and the normal distribution function p is used as the model function Func1 is assumed.

First, the gateway device 102 waits until a target message is received (NO in Step S202).

Then, in a case in which the target message is received (YES in Step S202), the gateway device 102 subtracts the measurement standard from the reception time to calculate the transmission interval (Step S204).

Then, the gateway device 102 updates the distribution of the transmission intervals of the target message on the basis of the calculated transmission interval. Specifically, the gateway device 102 updates the parameters of the normal distribution function p (Step S206).

Then, the gateway device 102 creates the model function Func1 on the basis of the updated parameters and modifies the created model function Func1 to create the score function Sc1 (Step S208).

An operation in Steps S210 to S218 is the same as the operation in Steps S112 to S120 illustrated in FIG. 9.

In addition, the gateway device 102 may use the mixed normal distribution function P as the model function Func2 instead of the normal distribution function p. In this case, in Step S206, the gateway device 102 updates c1 to cK, $\bar{x}_1$, to $\bar{x}_K$, and $\sigma1^2$ to $\sigma K^2$ which are the parameters of the mixed normal distribution function P.

Since the other configurations and operations are the same as those in the gateway device according to the first embodiment, the description thereof will not be repeated here.

As described above, in the gateway device according to the second embodiment of the invention, the monitoring unit 52 measures the transmission interval between the transmission messages. Then, the distribution creation unit 56 updates the distribution on the basis of the transmission interval measured by the monitoring unit 52.

This configuration makes it possible to update the distribution according to the degree of variation in the transmission interval, for example, even in a case in which there is a variation in the transmission interval between the transmission messages. Therefore, it is possible to reduce the possibility that an authorized transmission message will be erroneously detected as an unauthorized message.

Next, other embodiments of the invention will be described with reference to the drawings. In the drawings, the same or equivalent portions are denoted by the same reference numerals and the description thereof will not be repeated.

Third Embodiment

This embodiment relates to a gateway device which differs from the gateway device according to the first embodiment in that it uses a normal distribution function having a plurality of types of variables. The gateway device according to the third embodiment is the same as the gateway device according to the first embodiment except the following content.

Figure 14:
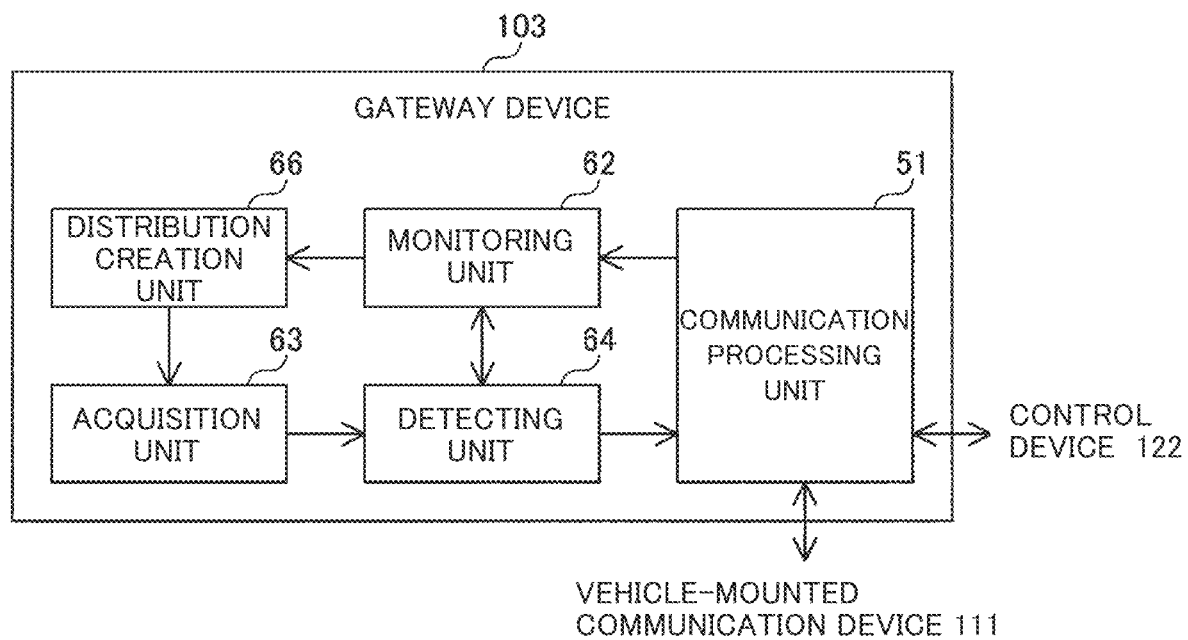
FIG. 14 is a diagram illustrating the configuration of a gateway device in a vehicle-mounted detecting system according to a third embodiment of the disclosure.

FIG. 14 is a diagram illustrating the configuration of the gateway device in a vehicle-mounted detecting system according to the third embodiment of the invention.

With reference to FIG. 14, a gateway device 103 includes a communication processing unit 51, a monitoring unit 62, an acquisition unit 63, a detecting unit 64, and a distribution creation unit 66.

The operations of the communication processing unit 51, the monitoring unit 62, the acquisition unit 63, and the detecting unit 64 in the gateway device 103 are the same as the operations of the communication processing unit 51, the monitoring unit 52, the acquisition unit 53, and the detecting unit 54 in the gateway device 101 illustrated in FIG. 3, respectively.

In a vehicle-mounted network 12, for example, a message including, as content, a measured value (hereinafter, also referred to a target measured value) which is a continuous value following a normal distribution is transmitted.

The target measured value is, for example, at least one of the speed of a vehicle provided with the vehicle-mounted network 12, that is, a target vehicle, the tire pressure of the target vehicle, the steering angle of the target vehicle, the accelerator position of the target vehicle, the number of revolutions and a cylinder pressure of an engine of the target vehicle, the weight of a person in the target vehicle, the acceleration of the target vehicle, the number of revolutions of a motor of the target vehicle, the braking torque of the target vehicle, the yaw rate of the target vehicle, and the reception intensity of radio waves used in the target vehicle.

In this example, in the vehicle-mounted network 12, a periodic message including any one of the target measured values is transmitted. In addition, the vehicle-mounted network 12, a periodic message including a plurality of target measured values may be transmitted.

More specifically, the measured value of the speed of the target vehicle is used in, for example, an instrument display control device. For example, the measured value of the tire pressure of the target vehicle is acquired by a near field communication terminal device using a TPMS and is used in a chassis control device. The measured value of the steering angle of the target vehicle is used in, for example, the chassis control device. The measured values of the accelerator position of the target vehicle and the number of revolutions and a cylinder pressure of the engine of the target vehicle are used in, for example, an engine control device. For example, the measured value of the weight of a person in the target vehicle is measured by a weight sensor provided in a seat and is used in an air bag control device. The measured value of the acceleration of the target vehicle is used in, for example, an AT control device. The measured value of the number of revolutions of the motor of the target vehicle is used in, for example, an HEV control device. The measured value of the braking torque of the target vehicle is used in, for example, the chassis control device and a brake control device. The measured value of the yaw rate of the target vehicle is used in, for example, the chassis control device and a steering control device. The measured value of the reception intensity of the radio waves used in the target vehicle, specifically, the reception intensity of radio waves in an LF band or a UHF band used for services, such as a smart entry and a TPMS, is used in, for example, the chassis control device and a smart entry control device.

For example, an ID indicating a periodic message including the target measured value, that is, the target message, that is, one registered ID is registered in the monitoring unit 62. In addition, a plurality of registered IDs may be registered in the monitoring unit 62.

For example, the monitoring unit 62 monitors a message relay process of the communication processing unit 51. In a case in which the communication processing unit 51 receives a message including a registered ID, that is, the target message, the monitoring unit 62 calculates the transmission interval of the target message and acquires the content of the target message.

The monitoring unit 62 outputs the calculated transmission interval and the acquired content of the target message, that is, the target measured value to the distribution creation unit 66 and the detecting unit 64.

For example, the distribution creation unit 66 updates the distribution of the transmission intervals and the target measured value on the basis of the transmission interval measured by the monitoring unit 62 and the target measured value acquired by the monitoring unit 62.

More specifically, for example, the distribution creation unit 66 uses a two-dimensional normal distribution function q as the model function Func3. Here, variables in the two-dimensional normal distribution function q are, for example, x and y.

For example, the distribution creation unit 66 updates the parameters of the normal distribution function q using the Welford-Knuth method disclosed in Non-Patent Document 2 and Non-Patent Document 3 whenever the transmission interval and the measurement target value are received from the monitoring unit 62.

Here, the parameters of the normal distribution function q are the mean $\bar{x}$ and variance $\sigma x^2$ of each transmission interval and the mean $\bar{y}$ and variance $\sigma y^2$ of each target measured value.

The distribution creation unit 66 stores, for example, the number of calculation operations m indicating the number of times the transmission interval is received from the monitoring unit 62 and increments the number of calculation operations m whenever the transmission interval is received from the monitoring unit 62.

The distribution creation unit 66 calculates the mean $\bar{x}$ and variance $\sigma x^2$ of each transmission interval using Expressions (11) to (13). In addition, the distribution creation unit 66 performs the same process as the process of calculating the mean $\bar{x}$ and variance $\sigma x^2$ of the transmission intervals to calculate the mean $\bar{y}$ and variance $\sigma y^2$ of the transmission intervals.

The distribution creation unit 66 outputs distribution information including the calculated parameters to the acquisition unit 63.

In a case in which the distribution information is received from the distribution creation unit 66, the acquisition unit 63 creates the model function Func3 represented by the normal distribution function q on the basis of the received distribution information and outputs the created model function Func3 to the detecting unit 64.

Figure 15:
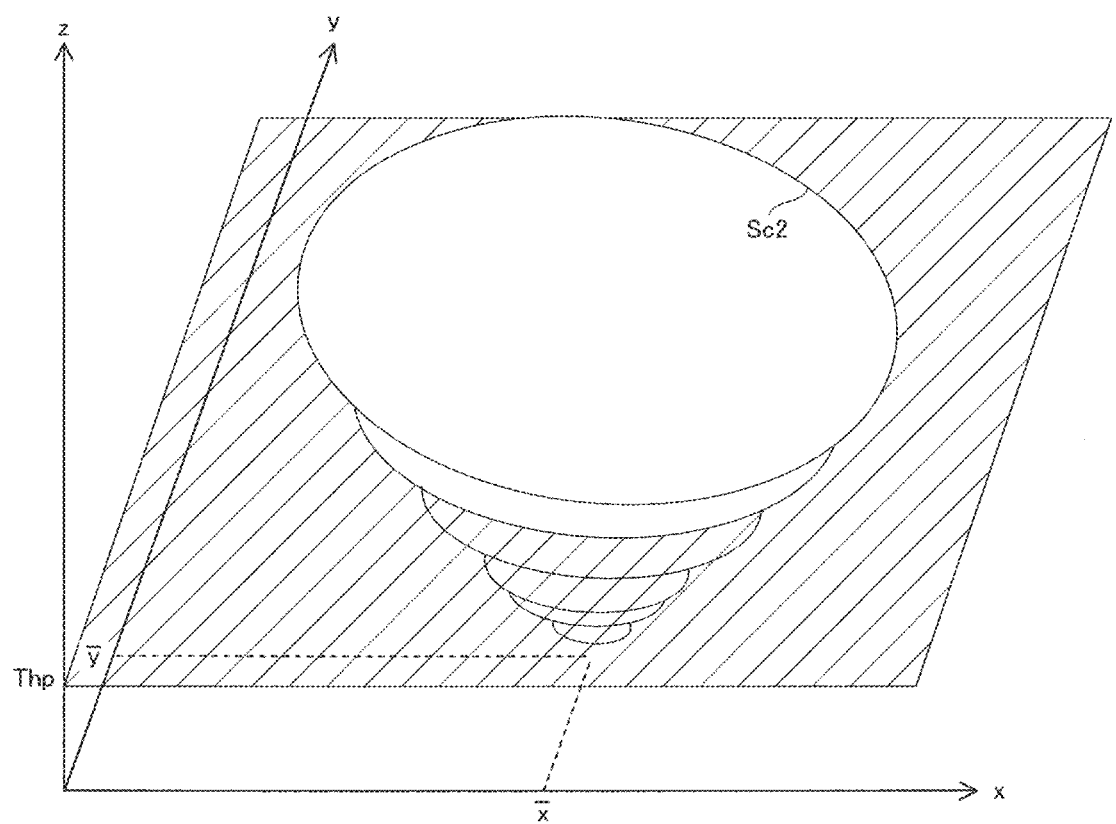
FIG. 15 is a diagram illustrating an example of the detection of an unauthorized message by a detecting unit in the gateway device according to the third embodiment of the disclosure.

FIG. 15 is a diagram illustrating an example of the detection of an unauthorized message by the detecting unit of the gateway device according to the third embodiment of the invention. In FIG. 15, the x-axis indicates the variable x, the y-axis indicates the variable y, and the z-axis indicates a score. The directions of the x-axis and the z-axis are the same as those of the horizontal axis and the vertical axis illustrated in FIG. 6, respectively.

With reference to FIG. 15, for example, the detecting unit 64 detects an unauthorized message on the basis of the transmission interval measured by the monitoring unit 62, the distribution information acquired by the acquisition unit 63, and the content of the transmission message monitored by the monitoring unit 62. Here, a threshold Thp is registered in the detecting unit 64.

Specifically, in a case in which the model function Func3 is received from the acquisition unit 63, the detecting unit 64 modifies the received model function Func3 to create a score function Sc2. More specifically, the detecting unit 64 creates, for example, −log(Func3) as the score function Sc2. The score function Sc2 is represented by a curved surface.

In FIG. 15, the score function Sc2 indicates the minimum value in a case in which the variable x is the mean $\bar{x}$ and the variable y is the mean $\bar{y}$.

The detecting unit 64 calculates a score by substituting the transmission interval and the measurement target value received from the monitoring unit 62 into the variable x and the variable y of the score function Sc2, respectively.

In a case in which the calculated score is equal to less than, for example, the threshold Thp, the detecting unit 64 determines that the currently transmitted target message is an authorized message.

On the other hand, in a case in which the calculated score is greater than the threshold Thp, the detecting unit 64 determines that the currently transmitted target message is an unauthorized message.

The detecting unit 64 notifies the monitoring unit 62 and the communication processing unit 51 of the determination result based on the transmission interval and the measurement target value received from the monitoring unit 62.

In the gateway device according to the third embodiment of the invention, the two-dimensional normal distribution function q is used as the model function Func3. However, the invention is not limited thereto. The gateway device 103 may use a normal distribution function of three or more dimensions. In this case, the variables of the normal distribution function are a transmission interval and a plurality of types of target measured values. In addition, in the gateway device 103, a mixed normal distribution function of two or more dimensions may be used as the model function Func3.

Further, the gateway device according to the third embodiment of the invention includes the distribution creation unit 66 and dynamically sets the parameters of the normal distribution function q. However, the invention is not limited thereto. The gateway device 103 may not include the distribution creation unit 66 and may fixedly use the parameters of the normal distribution function q. In addition, the gateway device 103 may dynamically set the parameters related to the transmission interval among the parameters of the normal distribution function q and may fixedly use the parameters related to the measurement target value. Alternatively, the gateway device 103 may fixedly use the parameters related to the transmission interval and may dynamically set the parameters related to the measurement target value.

As described above, in the gateway device according to the third embodiment of the invention, the detecting unit 64 detects an unauthorized message on the basis of the content of the transmission message monitored by the monitoring unit 62.

For example, this configuration makes it possible to detect, as an unauthorized message, the transmission message that is erroneously detected as an authorized transmission message on the basis of the transmission interval and the distribution even though it is an unauthorized message, on the basis of the content of the transmission message. Therefore, it is possible to more accurately detect an unauthorized message in the vehicle-mounted network.

In addition, in the gateway device according to the third embodiment of the invention, the content of the transmission message is a continuous value.

For example, this configuration makes it possible to create the distribution based on the content of the transmission message. Therefore, it is possible to detect, as an unauthorized message, a transmission message including content in the range in which the frequency is low in the distribution.

Further, in the gateway device according to the third embodiment of the invention, the continuous value is at least one of the speed of a vehicle provided with the vehicle-mounted network 12, the tire pressure of the vehicle, the steering angle of the vehicle, the accelerator position of the vehicle, the number of revolutions and a cylinder pressure of an engine of the vehicle, the weight of a person in the vehicle, the acceleration of the vehicle, the number of revolutions of a motor of the vehicle, the braking torque of the vehicle, the yaw rate of the vehicle, and the reception intensity of radio waves used in the vehicle.

As such, since the continuous value is a continuous value which varies from the mean, it is possible to create a distribution in which the frequency is concentrated in the vicinity of the mean and which is suitable for detecting an unauthorized message.

Since the other configurations and operations are the same as those in the gateway device according to the first embodiment, the description thereof will not be repeated here.

Some or all of the components and operations of the devices according to the first to third embodiments of the invention may be appropriately combined with each other.

The above-described embodiments need to be considered to be illustrative and non-restrictive in all respects. The scope of the invention is indicated by the claims rather than the above description and is intended to include all changes within the meaning and scope equivalent to the claims.

The above description includes the following appended characteristics.

APPENDIX 1

There is provided a detecting device that detects an unauthorized message in a vehicle-mounted network including a plurality of vehicle-mounted devices. The detecting device includes: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit. The vehicle-mounted device is a vehicle-mounted communication device that communicates with a device outside a vehicle provided with the vehicle-mounted network or a control device that is capable of controlling a functional unit in the vehicle. A normal transmission message is set so as to be transmitted with each predetermined period in the vehicle-mounted network. The acquisition unit acquires distribution information indicating a normal distribution which is determined by the mean and variance of each transmission interval between the transmission messages. The detecting unit detects the unauthorized message on the basis of the monitoring result of the monitoring unit and the distribution information acquired by the acquisition unit.

APPENDIX 2

There is provided a gateway device that relays a message between vehicle-mounted devices in a vehicle-mounted network. The gateway device includes: a monitoring unit that monitors a transmission message in the vehicle-mounted network; an acquisition unit that acquires a distribution of transmission intervals between the transmission messages; and a detecting unit that detects the unauthorized message on the basis of a monitoring result of the monitoring unit and the distribution acquired by the acquisition unit. The vehicle-mounted device is a vehicle-mounted communication device that communicates with a device outside a vehicle provided with the vehicle-mounted network or a control device that is capable of controlling a functional unit in the vehicle. A normal transmission message is set so as to be transmitted with each predetermined period in the vehicle-mounted network. The acquisition unit acquires distribution information indicating a normal distribution which is determined by the mean and variance of each transmission interval between the transmission messages. The detecting unit detects the unauthorized message on the basis of the monitoring result of the monitoring unit and the distribution information acquired by the acquisition unit.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. A detecting device that detects an unauthorized message in a vehicle-mounted network including a plurality of vehicle-mounted devices, comprising:
   a monitoring unit that monitors a transmission message in the vehicle-mounted network;
   an acquisition unit that acquires a distribution of transmission intervals between the transmission messages; and
   a detecting unit that detects the unauthorized message on the basis of a monitoring result of the monitoring unit and the distribution acquired by the acquisition unit,
   wherein the monitoring unit measures a plurality of the transmission intervals of a plurality of the transmission messages according to a predetermined measurement standard,
   the detecting unit calculates a plurality of scores on the basis of positions of the plurality of the transmission intervals in the distribution, and detects the unauthorized message among the plurality of the transmission messages, on the basis of a comparison result of the plurality of scores of the plurality of the transmission intervals, and
   the monitoring unit uses, as a new predetermined measurement standard, a reception timing of a transmission message other than a transmission message detected as the unauthorized message among the plurality of the transmission messages.

2. The detecting device according to claim 1,
   wherein the detecting unit detects the unauthorized message on the basis of content of the transmission message monitored by the monitoring unit.

3. The detecting device according to claim 2,
   wherein the content is a continuous value.

4. The detecting device according to claim 3,
   wherein the continuous value is at least one of a speed of a vehicle provided with the vehicle-mounted network, a tire pressure of the vehicle, a steering angle of the vehicle, an accelerator position of the vehicle, the number of revolutions and a cylinder pressure of an engine of the vehicle, weight of a person in the vehicle, acceleration of the vehicle, the number of revolutions of a motor of the vehicle, braking torque of the vehicle, a yaw rate of the vehicle, and reception intensity of radio waves used in the vehicle.

5. The detecting device according to claim 1,
   wherein
   the detecting unit detects the unauthorized message on the basis of a result of comparison between the plurality of scores and a predetermined threshold.

6. The detecting device according to claim 1,
   wherein
   the detecting device further includes a distribution creation unit that updates the distribution on the basis of the plurality of the transmission interval measured by the monitoring unit.

7. The detecting device according to claim 1,
   wherein the acquisition unit acquires the distribution which has been created in advance by another device.

8. A gateway device that relays a message between vehicle-mounted devices in a vehicle-mounted network, comprising:

a monitoring unit that monitors a transmission message in the vehicle-mounted network;
an acquisition unit that acquires a distribution of transmission intervals between the transmission messages; and
a detecting unit that detects an unauthorized message on the basis of a monitoring result of the monitoring unit and the distribution acquired by the acquisition unit,
wherein the monitoring unit measures a plurality of the transmission intervals of a plurality of the transmission messages according to a predetermined measurement standard,
the detecting unit calculates a plurality of scores on the basis of positions of the plurality of the transmission intervals in the distribution, and detects the unauthorized message among the plurality of the transmission messages, on the basis of a comparison result of the plurality of scores of the plurality of the transmission intervals, and
the monitoring unit uses, as a new predetermined measurement standard, a reception timing of a transmission message other than a transmission message detected as the unauthorized message among the plurality of the transmission messages.

9. A detecting method in a detecting device that detects an unauthorized message in a vehicle-mounted network including a plurality of vehicle-mounted devices, the method comprising:
a step of monitoring a transmission message in the vehicle-mounted network;
a step of acquiring a distribution of transmission intervals between the transmission messages; and
a step of detecting the unauthorized message on the basis of a monitoring result and the acquired distribution,
wherein, in the step of monitoring the transmission message, a plurality of the transmission intervals of a plurality of the transmission messages are measured according to a predetermined measurement standard,
in the step of detecting the unauthorized message, a plurality of scores are calculated on the basis of positions of the plurality of the transmission intervals in the distribution, and the unauthorized message is detected among the plurality of the transmission messages, on the basis of a comparison result of the plurality of scores of the plurality of the transmission intervals, and
in the step of monitoring the transmission message, a reception timing of a transmission message other than a transmission message detected as the unauthorized message among the plurality of the transmission messages is used as a new predetermined measurement standard.

10. A detecting method in a gateway device that relays a message between vehicle-mounted devices in a vehicle-mounted network, the method comprising:
a step of monitoring a transmission message in the vehicle-mounted network;
a step of acquiring a distribution of transmission intervals between the transmission messages; and
a step of detecting an unauthorized message on the basis of a monitoring result and the acquired distribution,
wherein, in the step of monitoring the transmission message, a plurality of the transmission intervals of a plurality of the transmission messages are measured according to a predetermined measurement standard,
in the step of detecting the unauthorized message, a plurality of scores are calculated on the basis of positions of the plurality of the transmission intervals in the distribution, and the unauthorized message is detected among the plurality of the transmission messages, on the basis of a comparison result of the plurality of scores of the plurality of the transmission intervals, and
in the step of monitoring the transmission message, a reception timing of a transmission message other than a transmission message detected as the unauthorized message among the plurality of the transmission messages is used as a new predetermined measurement standard.

* * * * *